United States Patent
Islam et al.

(10) Patent No.: US 10,440,032 B2
(45) Date of Patent: Oct. 8, 2019

(54) METHOD, APPARATUS, AND RECORDING MEDIUM FOR SHARING USE AUTHORITY WITH RESPECT TO SERVICE

(71) Applicant: Samsung Electronics Co., Ltd., Suwon-si, Gyeonggi-do (KR)

(72) Inventors: Mohammad Shahidul Islam, Dacca (BD); Redwan Ui Haq Choyon, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 15/280,242

(22) Filed: Sep. 29, 2016

(65) Prior Publication Data
US 2017/0134393 A1    May 11, 2017

(30) Foreign Application Priority Data
Nov. 6, 2015  (KR) .................. 10-2015-0155795

(51) Int. Cl.
*H04L 29/06*    (2006.01)

(52) U.S. Cl.
CPC ........ *H04L 63/108* (2013.01); *H04L 63/0884* (2013.01)

(58) Field of Classification Search
CPC ................ H04L 63/0884; H04L 63/108
See application file for complete search history.

(56) References Cited

U.S. PATENT DOCUMENTS

| | | | | |
|---|---|---|---|---|
| 2006/0230437 | A1* | 10/2006 | Alexander Boyer | G06F 21/6245 726/4 |
| 2008/0083021 | A1* | 4/2008 | Doane | G06F 21/31 726/5 |
| 2010/0146611 | A1* | 6/2010 | Kuzin | G06F 21/41 726/8 |
| 2010/0319068 | A1* | 12/2010 | Abbadessa | H04L 63/08 726/21 |
| 2011/0225643 | A1* | 9/2011 | Faynberg | G06F 21/31 726/10 |
| 2012/0117626 | A1* | 5/2012 | Yates | H04L 9/3213 726/4 |
| 2014/0068727 | A1 | 3/2014 | Shamis et al. | |
| 2014/0380429 | A1* | 12/2014 | Matsugashita | H04L 63/0823 726/4 |

FOREIGN PATENT DOCUMENTS

KR    10-2005-0086106 A    8/2005

* cited by examiner

*Primary Examiner* — Harunur Rashid
(74) *Attorney, Agent, or Firm* — Jefferson IP Law, LLP

(57) ABSTRACT

A method of a second terminal for sharing a use authority of a service allowed by a first user of a first terminal is provided. The method includes requesting an authorization server for authentication information of the service, wherein the authorization server stores identification information of a second user with whom the use authority is sharable and a validity period during which the use authority is shared with the second user, when a user of the second terminal corresponds to the second user, receiving the authentication information from the authorization server, and, receiving the use authority of the service during the validity period.

9 Claims, 21 Drawing Sheets

METHOD, APPARATUS, AND RECORDING MEDIUM FOR SHARING USE AUTHORITY WITH RESPECT TO SERVICE

CROSS-REFERENCE TO RELATED APPLICATION(S)

This application claims the benefit under 35 U.S.C. § 119(a) of a Korean patent application filed on Nov. 6, 2015 in the Korean Intellectual Property Office and assigned serial number 10-2015-0155795, the entire disclosure of which is hereby incorporated by reference.

TECHNICAL FIELD

The present disclosure relates to a method and apparatus for sharing a use authority with respect to a service, and a non-transitory computer-readable recording medium having recorded thereon a program for executing the method of sharing a use authority with respect to a service.

BACKGROUND

The Internet is evolving from a human-centered connection network in which people generate and use information to an Internet of Things (IoT) network in which information is exchanged and processed between distributed elements such as objects. Internet of Everything (IoE) technology in which big data processing is combined with the IoT technology by connection to a cloud server, or the like is coming to the fore. In order to implement the IoT, technical elements such as a sensing technique, wired and wireless communication and network infrastructure, a service interface technique, a security technique, etc. are required, and thus, recently, a sensor network for connection between objects, machine to machine (M2M) communication, machine-type communication (MTC), or the like are being studied.

In an IoT environment, an intelligent Internet Technology (IT) service to enhance everyday life may be provided by collecting and analyzing data generated in connected objects. The IoT converged and mixed with existing IT technologies in various industries may be applied to fields such as smart homes, smart buildings, smart cities, smart cars, connected cars, a smart grid, healthcare, smart appliances, high-tech medical services, disaster network communication, or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for sharing a use authority with respect to a service so as to increase convenience of use of a service by allowing the service allowed for a user of a terminal to be used by another user of another terminal.

In accordance with an aspect of the present disclosure, a method of an authorization server for sharing a use authority with respect to a service allowed for a user of a first terminal is provided. The method includes obtaining, from the first terminal, identifier information of at least one other user with whom the use authority is sharable and information about a validity period during which the use authority is shared with the at least one other user, when authentication information used in sharing the use authority with respect to the service is requested by a second terminal, determining whether or not a user of the second terminal is included among the at least one other user and when the user of the second terminal is included among the at least one other user, transmitting the requested authentication information to the second terminal.

The method may further include receiving an authentication information request for the service from the second terminal, wherein the authentication information request includes identifier information of the user of the second terminal.

The method may further include transmitting validity period information corresponding to the user of the second terminal to the second terminal.

The method may further include classifying the identifier information of the at least one other user into a group according to the validity period, and storing the group.

In accordance with another aspect of the present disclosure, a method of a first terminal for sharing a use authority with respect to a service is provided. The method includes determining, based on an input by a user of the first terminal, at least one other user with whom the use authority with respect to the service allowed for the user is sharable and a validity period during which the use authority is shared with the at least one other user and transmitting identifier information of the at least one other user and information about the validity period to an authorization server, wherein, when a user of a second terminal which requests the authorization server for the use authority with respect to the service is included among the at least one other user, the second terminal obtains the use authority with respect to the service.

When user authentication information indicating the user of the first terminal is obtained, the method may further include displaying a user interface for receiving an input of information of the at least one other user with whom the use authority with respect to the service is to be shared.

The method may further include displaying information about at least one service allowed for the user of the first terminal and selecting one of the at least one service, based on an input by the user of the first terminal.

In accordance with another aspect of the present disclosure, a method of sharing a use authority with respect to a service allowed for a user of a first terminal is provided. The method includes requesting an authorization server for authentication information regarding the service, wherein the authorization server stores identifier information of at least one other user with whom the use authority with respect to the service is sharable and information about a validity period during which the use authority is shared with the at least one other user, when a user of the second terminal is included among the at least one other user, receiving the authentication information from the authorization server, and obtaining the use authority with respect to the service during the validity period set with respect to the user of the second terminal, based on the authentication information.

The method may further include transmitting the authentication information to a service providing apparatus that provides the service.

The method may further include receiving, from the authorization server, validity period information corresponding to the user of the second terminal.

In accordance with another aspect of the present disclosure, an authorization server for sharing a use authority with respect to a service allowed for a user of a first terminal is provided. The authorization server includes a communicator configured to obtain, from the first terminal, identifier information of at least one other user with whom the use authority is sharable and information about a validity period during which the use authority is shared with the at least one other user and a controller configured to, when authentication information used in sharing the use authority with respect to the service is requested by a second terminal, determine whether or not a user of the second terminal is included among the at least one other user, and wherein, when the user of the second terminal is included among the at least one other user, the communicator is further configured to transmit the requested authentication information to the second terminal.

The communicator may be further configured to receive an authentication information request for the service from the second terminal, wherein the authentication information request includes identifier information of the user of the second terminal.

The communicator may be further configured to transmit validity period information corresponding to the user of the second terminal to the second terminal.

The controller may be further configured to classify the identifier information of the at least one other user into a group according to the validity period, and to store the group.

In accordance with another aspect of the present disclosure, a first terminal for sharing a use authority with respect to a service is provided. The first terminal includes a controller configured to determine, based on an input by a user of the first terminal, at least one other user with whom the use authority with respect to the service allowed for the user is sharable and a validity period during which the use authority is shared with the at least one other user and a communicator configured to transmit identifier information of the at least one other user and information about the validity period to an authorization server, wherein, when a user of a second terminal which requests the authorization server for the use authority with respect to the service is included among the at least one other user, the second terminal obtains the use authority with respect to the service.

The first terminal may further include an output unit configured to, when user authentication information indicating the user of the first terminal is obtained, display a user interface for receiving an input of information of the at least one other user with whom the use authority with respect to the service is to be shared.

The output unit may be further configured to display information about at least one service allowed for the user of the first terminal, and the controller may be further configured to select one of the at least one service, based on an input by the user of the first terminal.

In accordance with another aspect of the present disclosure, a second terminal for sharing a use authority with respect to a service allowed for a user of a first terminal is provided. The second terminal includes a communicator configured to request an authorization server for authentication information regarding the service, wherein the authorization server stores identifier information of at least one other user with whom the use authority with respect to the service is sharable and information about a validity period during which the use authority is shared with the at least one other user, and to receive the authentication information from the authorization server when a user of the second terminal is included among the at least one other user and a controller configured to obtain the use authority with respect to the service during the validity period set with respect to the user of the second terminal, based on the authentication information.

The communicator may be further configured to transmit the authentication information to a service providing apparatus that provides the service.

The communicator may be further configured to receive, from the authorization server, validity period information corresponding to the user of the second terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

Figure 1:
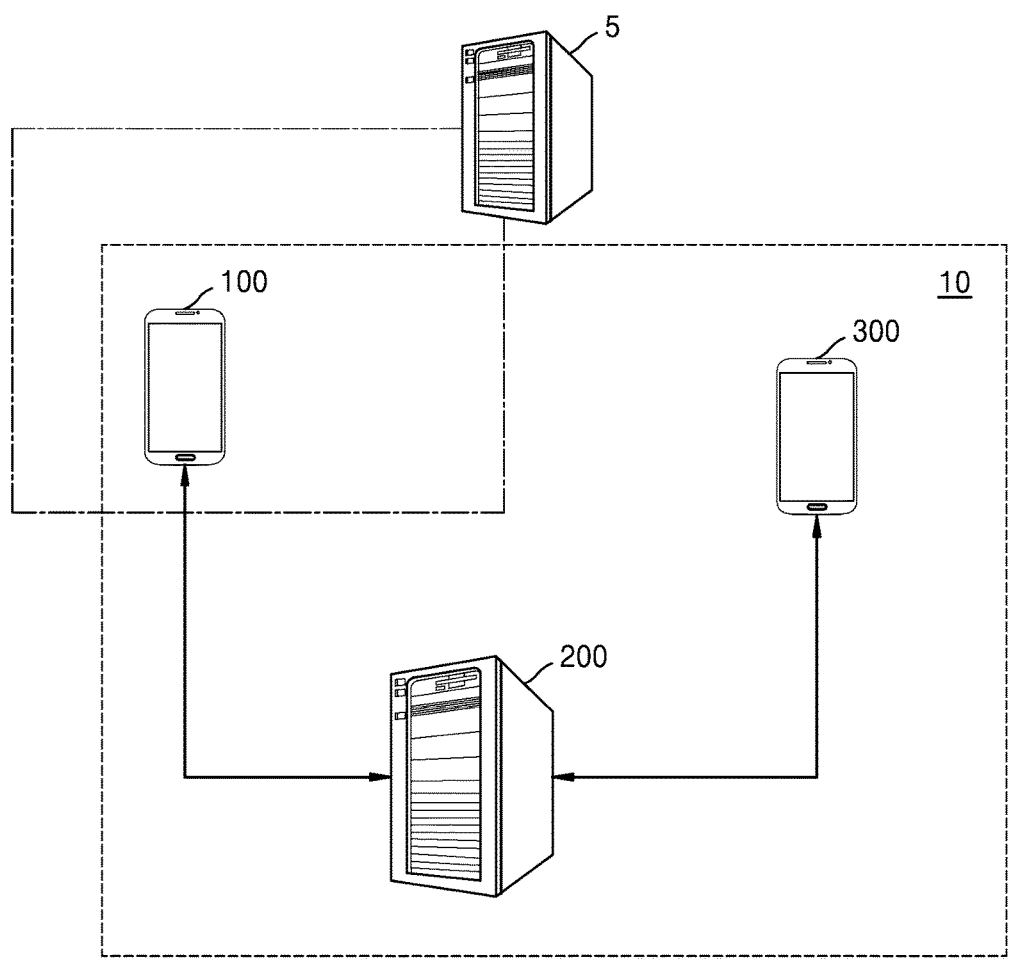
FIG. 1 illustrates a system for sharing a use authority with respect to a service according to an embodiment of the present disclosure.

FIG. 1 illustrates a system for sharing a use authority with respect to a service according to an embodiment of the present disclosure.

Referring to FIG. 1, a use authority sharing system 10 may include a first terminal 100, second terminal 300, and an authorization server 200.

FIG. 1 illustrates the use authority sharing system 10 only including elements related to the present embodiment. However, it is obvious to one of ordinary skill in the art that the use authority sharing system 10 may further include general-use elements as well as the elements shown in FIG. 1.

A user of the first terminal 100 may receive, via the first terminal 100, a service provided by a service providing server 5. In the present disclosure, the service may be provided only to a terminal that obtained a use authority. For example, the service may include a Wireless Fidelity (Wi-Fi) connection service, a door-lock unlock service, a bank account access service, and a website access service, and the technical concept of the disclosure is not limited thereto.

In the present disclosure, it is assumed that the user of the first terminal 100 already obtained the use authority with respect to the service that may be provided by the service providing server 5. For example, the first terminal 100 may transmit, to the service providing server 5, user authentication information including an identifier and password that are pre-registered in the service providing server 5, and thus may obtain the use authority with respect to receiving the service.

The first terminal 100 according to the present embodiment may share the use authority with respect to the service with another user via the authorization server 200. The first terminal 100 may determine the other user with whom the use authority with respect to the service is shared, based on an input of the user of the first terminal 100. The first terminal 100 may include, but is not limited to, a mobile phone, a smartphone, a wearable device, a laptop computer, and a tablet personal computer (PC).

The authorization server 200 according to the present embodiment may obtain information of at least one other user with whom the use authority with respect to the service allowed for the user of the first terminal 100 may be shared. Also, the authorization server 200 may obtain information regarding a validity period during which the use authority with respect to the service may be shared with the at least one other user. The information of the at least one other user with whom the use authority with respect to the service is sharable, and the information regarding the validity period during which the use authority with respect to the service is shared may be stored in the authorization server 200.

The authorization server 200 may receive, from the second terminal 300, a request for authentication information used in sharing the service allowed for the user of the first terminal 100. Based on identifier information of a user of the second terminal 300 which is included in the request for authentication information from the second terminal 300, the authorization server 200 may determine if the user of the second terminal 300 is included in the at least one other user with whom the use authority with respect to the service is shared. When the user of the second terminal 300 is included in the at least one other user, the authorization server 200 may transmit the authentication information for obtaining the use authority with respect to the service to the second terminal 300.

According to the present embodiment, the authentication information provided for sharing of the service may be different from user authentication information assigned to a user. For example, the authentication information may include an access token, or the like. By differently setting the user authentication information from the authentication information provided to another user, it is possible to prevent that the user authentication information is externally exposed. However, according to another embodiment, the authentication information provided for sharing of the service may be equal to the user authentication information.

In order to use the service allowed for the user of the first terminal 100, the second terminal 300 may request the authorization server 200 for the authentication information used in sharing the use authority with respect to the service. Since information about the user of the second terminal 300 is included in the information of the at least one other user with whom the use authority with respect to the service is shared, the information of the at least one other user being stored in the authorization server 200, the second terminal 300 may receive the authentication information from the authorization server 200.

The second terminal 300 according to the present embodiment may transmit, to the service providing server 5, the authentication information received from the authorization server 200, and thus may obtain the use authority with respect to receiving the service. In this regard, the second terminal 300 may obtain the use authority with respect to receiving the service for a preset validity period from the authorization server 200.

According to the present embodiment, the second terminal 300 may include, but is not limited to, a mobile phone, a smartphone, a wearable device, a laptop computer, and a tablet PC.

Figure 2:
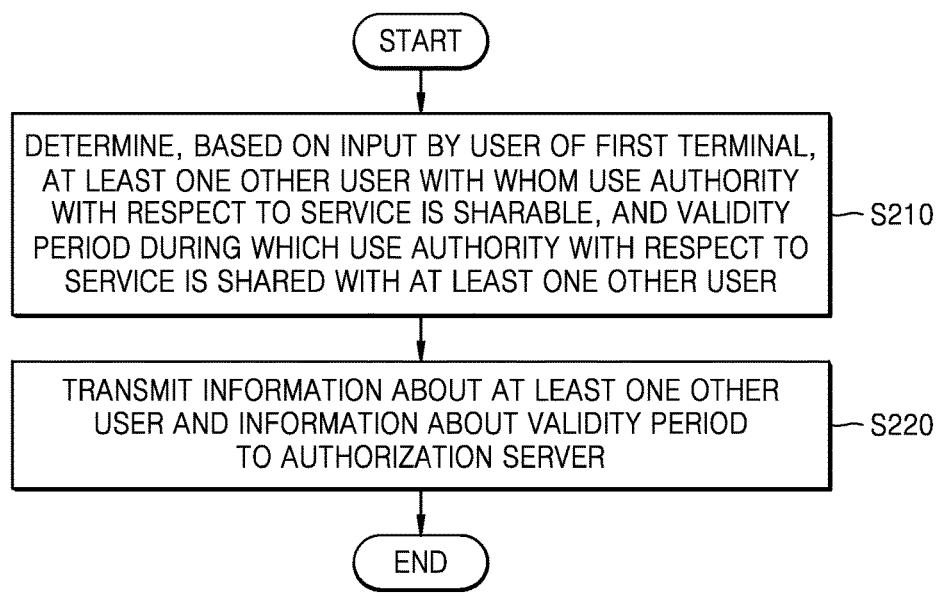
FIG. 2 is a flowchart of a method of sharing a use authority with respect to a service according to an embodiment of the present disclosure.

FIG. 2 is a flowchart for describing a method of sharing a use authority with respect to a service according to an embodiment of the present disclosure.

Referring to FIG. 2, in operation S210, the first terminal 100 determines, based on an input by a user of the first terminal 100, at least one other user with whom the use authority with respect to the service is sharable, and a validity period during which the use authority with respect to the service is shared with the at least one other user.

The user of the first terminal 100 according to the present embodiment may be a user who obtained a use authority with respect to at least one service. For example, the user of the first terminal 100 may be the user who joined a Wi-Fi service, and may obtain the use authority by transmitting user authentication information such as an identifier and password to a Wi-Fi service providing server.

The user of the first terminal 100 may select at least one other user with whom the use authority with respect to the service is to be shared. For example, the user of the first terminal 100 may select the at least one other user with whom the use authority with respect to the service is to be shared, from among acquaintances of the user which are stored in a phonebook application, a social networking service (SNS) application, or the like that is executed in the first terminal 100.

The first terminal 100 may determine the at least one other user, based on a user input for selecting the at least one other user, the user input received from the user of the first terminal 100.

The first terminal 100 may determine the validity period during which the use authority with respect to the service may be shared with the at least one other user. Here, the validity period may be determined as a time period, the number of times, or a time duration, and the technical concept of the disclosure is not limited thereto. For example, the first terminal 100 may set the validity period as every week during which the use authority with respect to the service may be shared with another user A. As another example, the first terminal 100 may set the validity period for three hours after a particular point of time during which the use authority with respect to the service may be shared with another user B. As another example, the first terminal 100 may set the validity period as three times by which the use authority with respect to the service may be shared with another user C.

According to another embodiment, when a plurality of pieces of identifier information of other terminals are stored in the first terminal 100, at least one terminal with whom the use authority with respect to the service is sharable may be selected according to a user input. Here, the plurality of pieces of identifier information of other terminals may include Internet Protocol (IP) information, or the like.

In operation S220, the first terminal 100 transmits information about at least one terminal and information about the validity period to an authorization server.

The first terminal 100 may transmit, to the authorization server 200, the information of the at least one other user with whom the use authority with respect to the service is shared. Here, the information of the at least one other user may include an identifier, a password, a personal identification number (PIN), or the like of the at least one other user, and the technical concept of the disclosure is not limited thereto. Also, the first terminal 100 may transmit, to the authorization server 200, the information about the validity period during which the use authority with respect to the service is shared with the at least one other user.

Figure 3:
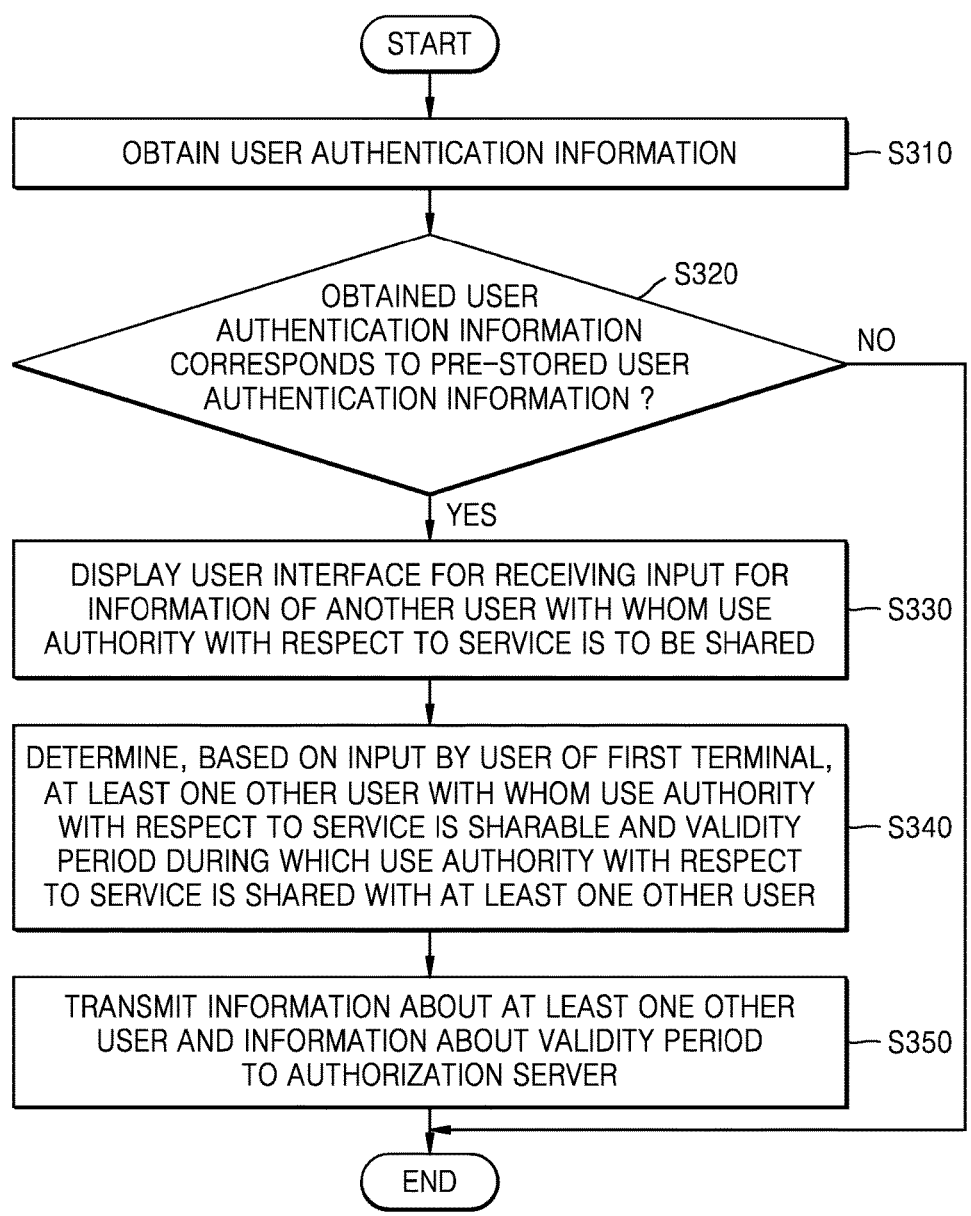
FIG. 3 is a flowchart of a method of sharing a use authority with respect to a service according to an embodiment of the present disclosure.

FIG. 3 is a flowchart of a method of sharing a use authority with respect to a service according to an embodiment of the present disclosure.

Referring to FIG. 3, in operation S310, the first terminal 100 may obtain user authentication information.

A user of the first terminal 100 according to the present embodiment may request a user interface for inputting information of another user with whom the use authority with respect to the service is shared. When the first terminal 100 receives the request from the user of the first terminal 100, the first terminal 100 may display a window for inputting the user authentication information. The user may input the user authentication information to the displayed window. The user authentication information may include an identifier, a password, or the like of the user of the first terminal 100 which are preset.

In operation S320, the first terminal 100 may determine whether or not the obtained user authentication information corresponds to pre-stored user authentication information.

The first terminal 100 may determine whether or not a pre-stored identifier and password of the user correspond to the obtained identifier and password of the user.

In operation S330, the first terminal 100 may display a user interface for receiving an input for information of another user with whom the use authority with respect to the service is to be shared.

For example, the user interface may display information about at least one service that is allowed for the user of the first terminal 100. The user interface may also display a plurality of pieces of identifier information of other users stored in the first terminal 100.

As another example, when the first terminal 100 stores information about a group in which other users are classified according to a certain standard, the user interface may display information about the group. Here, the plurality of pieces of aforementioned information may be sequentially displayed when a user input is input to the user interface.

In operation S340, the first terminal 100 may determine, based on an input by the user of the first terminal 100, at least one other user with whom the use authority with respect to the service is sharable and a validity period during which the use authority with respect to the service is shared with the at least one other user.

In this regard, the operation S340 may correspond to the operation S210 described above with reference to FIG. 2.

In operation S350, the first terminal 100 may transmit information of the at least one other user and information about the validity period to the authorization server 200.

In this regard, the operation S350 may correspond to the operation S220 described above with reference to FIG. 2.

Figure 4:
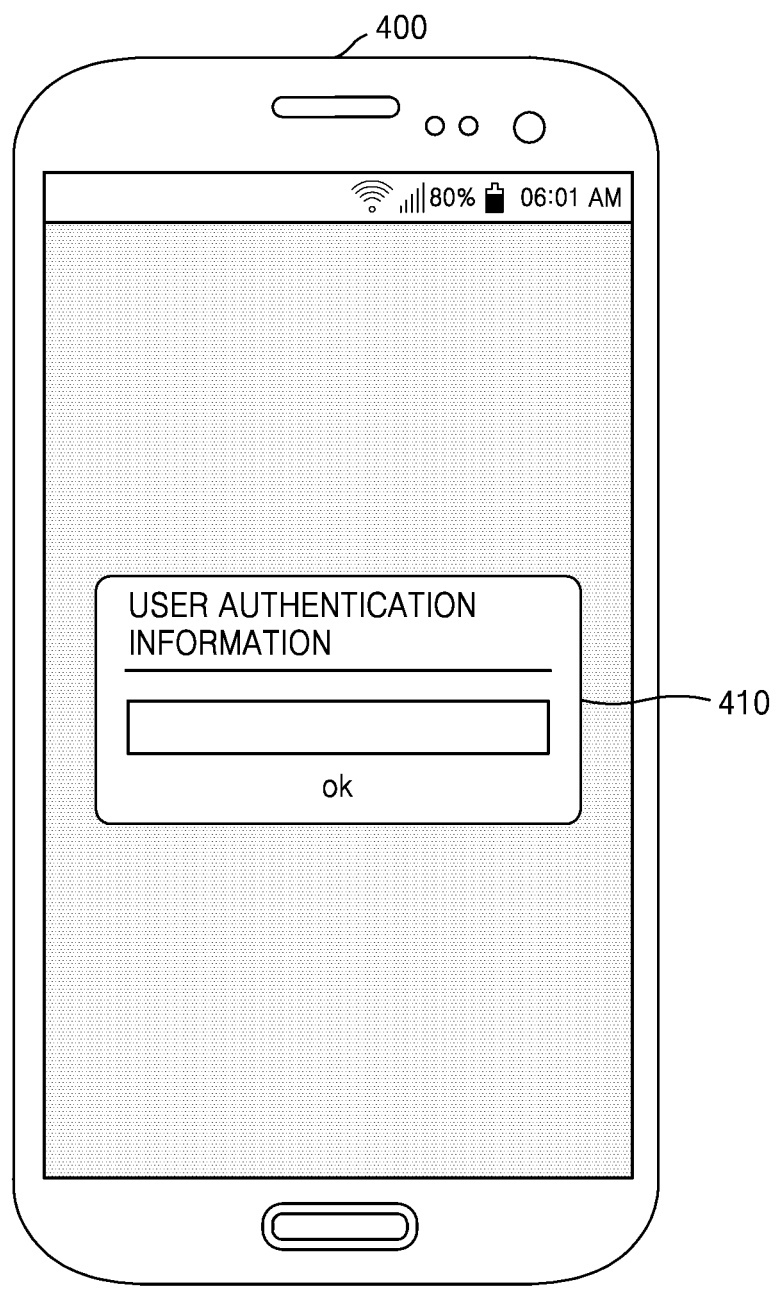
FIG. 4 illustrates a screen of a first terminal which is related to a method of requesting a user of the first terminal to input user authentication information according to an embodiment of the present disclosure.

FIG. 4 illustrates a screen of a first terminal which is related to a method of requesting a user of the first terminal to input user authentication information according to an embodiment of the present disclosure.

Referring to FIG. 4, when the user of the first terminal 400 attempts to set another user with whom a use authority with respect to a service is to be shared, the service being allowed for the user of the first terminal 400, the first terminal 400 according to the present embodiment may request an input for user authentication information. Referring to FIG. 4, the first terminal 400 may display, on the screen, a user interface including a message window 410 for requesting the user authentication information. The user authentication information may be transmitted from the authorization server 200 to the first terminal 400. Here, the user authentication information may include an identifier, a password, and the like which are pre-registered in the authorization server 200. When the user authentication information is input to the message window 410 of the first terminal 400, the first terminal 400 may transmit the input user authentication information to the authorization server 200. When the received user authentication information corresponds to pre-registered user authentication information, the authorization server 200 may store information about the other user with whom the use authority with respect to the service is to be shared.

When the user of the first terminal 400 attempts to change pre-stored another user with whom the use authority with respect to the service is to be shared or a pre-stored validity period during which the use authority with respect to the service is shared, the first terminal 400 may display, on the screen, the user interface including the message window 410 for requesting the user authentication information.

Figure 5:
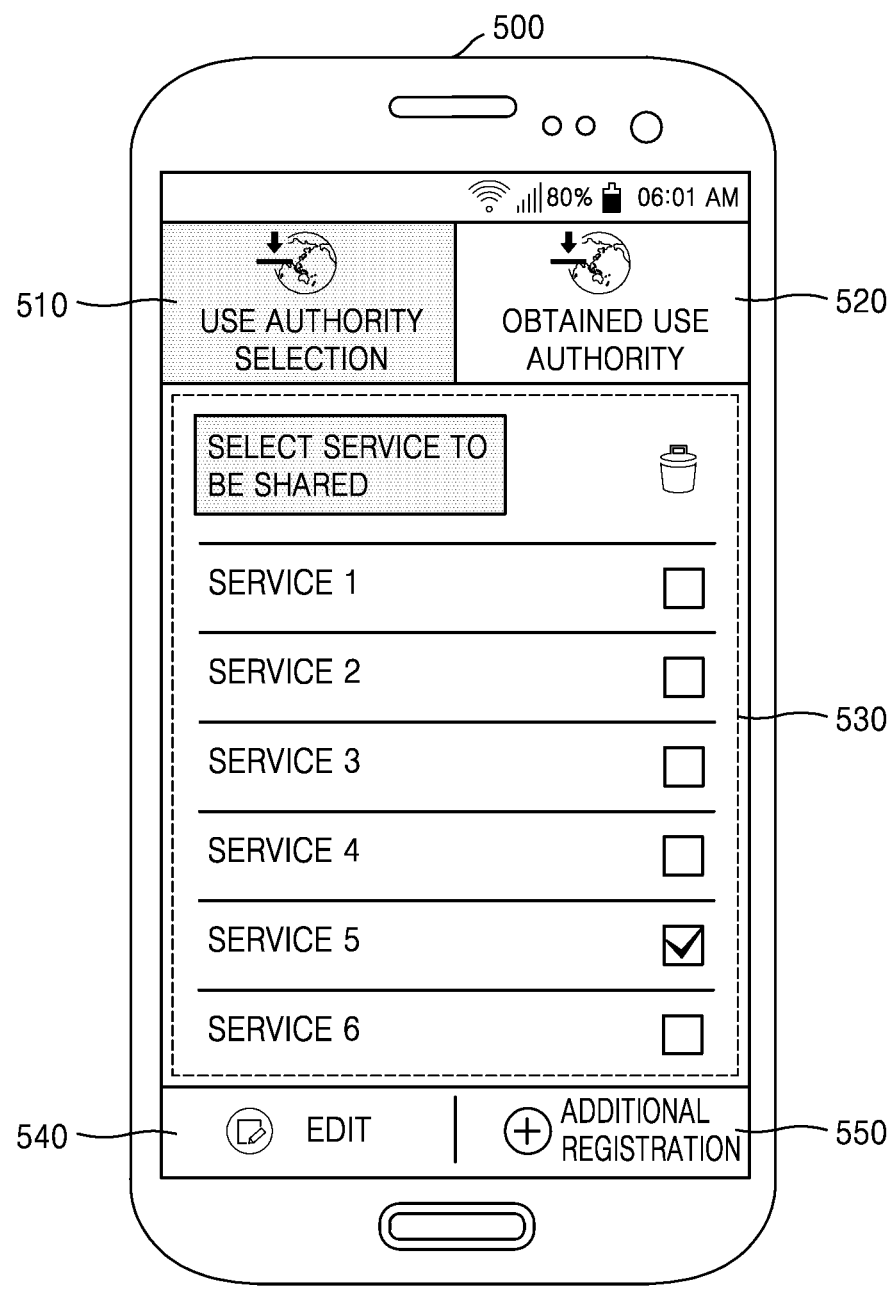
FIG. 5 illustrates a screen of a first terminal which is related to a method of providing a user interface for selecting a service with respect to which use authority is shared with another user according to an embodiment of the present disclosure.

FIG. 5 illustrates a screen of a first terminal which is related to a method of providing a user interface for selecting a service with respect to which use authority is shared with another user according to an embodiment of the present disclosure.

Referring to FIG. 5, when a user of the first terminal 500 selects a use authority selecting tab 510 from among the use authority selecting tab 510 and an obtained use authority tab 520, the list of the plurality of services 530 for which use authority is sharable with another user may be displayed on the screen of the first terminal 500. The user of the first terminal 500 may select at least one service by touching a checkbox for the at least one service from the list of a plurality of services 530.

When the user of the first terminal 500 according to the present embodiment touches an additional registration tab 550 included in a user interface, the at least one service selected by the user of the first terminal 500 may be stored. Afterward, the first terminal 500 may display a user interface for setting another user with whom a use authority with respect to the at least one service is to be shared and setting a validity period during which the use authority with respect to the at least one service is shared. This will be described at a later time with reference to FIGS. 6 and 7.

The user of the first terminal 500 may change pre-stored information about a use authority with respect to a shared service by touching an editing tab 540 included in the user interface.

When the user of the first terminal 500 touches the additional registration tab 550 or the editing tab 540, the first terminal 500 may display the message window 410 for requesting the user authentication information described with reference to FIG. 4, and thus may prevent that information about the use authority with respect to the service is changed by another user who is not the user of the first terminal 500.

Referring to FIG. 5 according to another embodiment, when the user of the first terminal 500 selects the obtained use authority tab 520, the first terminal 500 may share a use authority with respect to a service which is obtained by another user. When the obtained use authority tab 520 is selected, information about a use authority with respect to a service that another user allows sharing with the user of the first terminal 500 may be displayed on a screen of the first terminal 500. In this case, the first terminal 500 may operate to correspond to the second terminal 300 described with reference to FIG. 1.

Figure 6:
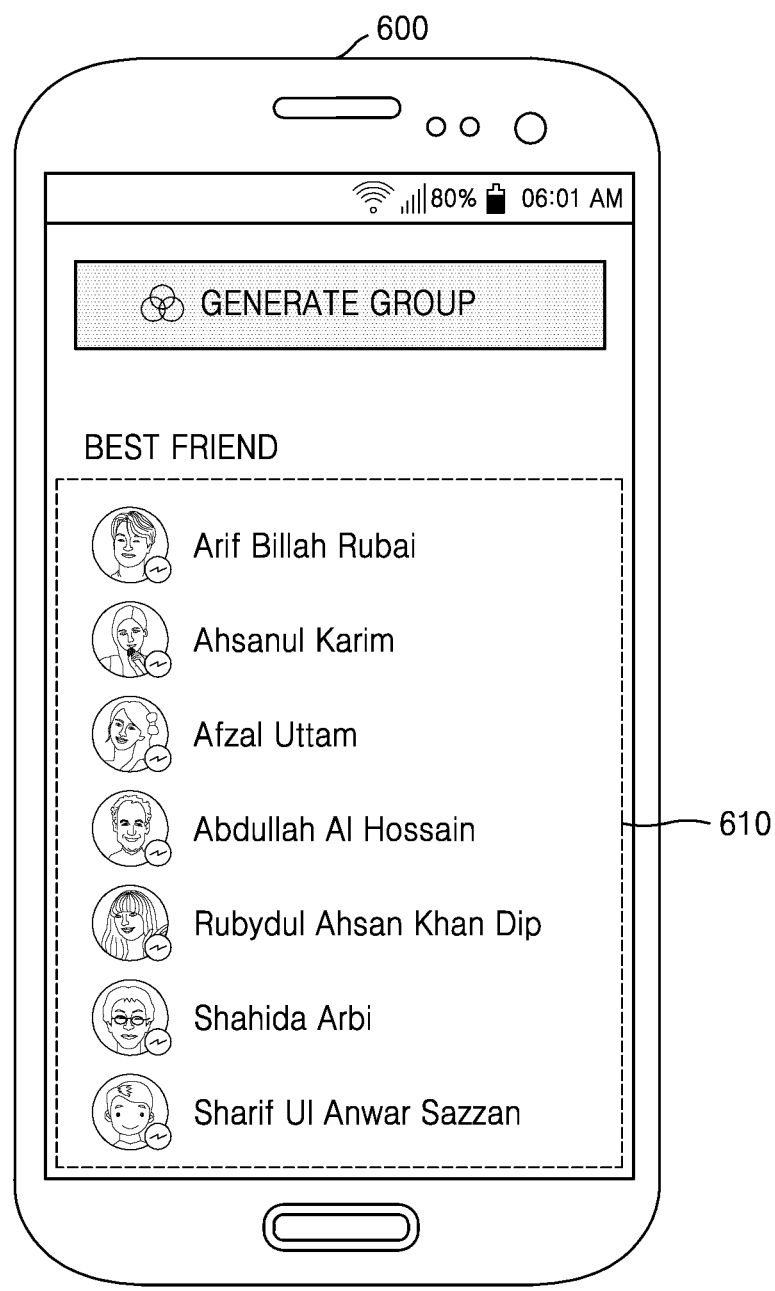
FIG. 6 illustrates a screen of a first terminal which is related to a method of providing a user interface for selecting another user with whom a use authority with respect to a service that is allowed for a user of the first terminal is to be shared according to an embodiment of the present disclosure.

FIG. 6 illustrates a screen of a first terminal which is related to a method of providing a user interface for selecting another user with whom a use authority with respect to a service that is allowed for a user of the first terminal is to be shared according to an embodiment of the present disclosure.

Referring to FIG. 6, the first terminal 600 may display a list 610 stored in the first terminal 600 and including a plurality of pieces of information about acquaintances of the user of the first terminal 600. The plurality of pieces of information about acquaintances of the user of the first terminal 600 may include, but are not limited to, names, contact information, addresses, etc. of the acquaintances.

In the first terminal 600, a plurality of pieces of information about the acquaintances of the user of the first terminal 600 which are provided by a particular service may be classified into groups. For example, in a case of an SNS service, the acquaintances of the user of the first terminal 600 may be classified into a best friend group, a family group, a colleague group, and the like according to setting by the user of the first terminal 600. The user of the first terminal 600 may select at least one of the groups set for a service, and may share a use authority with respect to the service.

For example, the user of the first terminal 600 may select the best friend group and may share a use authority so as to allow acquaintances included in the best friend group to use an account of the user in the SNS service.

The user of the first terminal 600 may set a scope of a service with respect to which use authority is shared. For example, in the SNS service, a use authority of a service which is to be shared may be classified into an authority allowing another user to upload bulletins, instead of the user, an authority allowing the other user to edit bulletins of the user, or the like. The user of the first terminal 600 may select a particular use authority among classified use authorities of the service and may share the particular use authority with acquaintances in a selected group.

Figure 7:
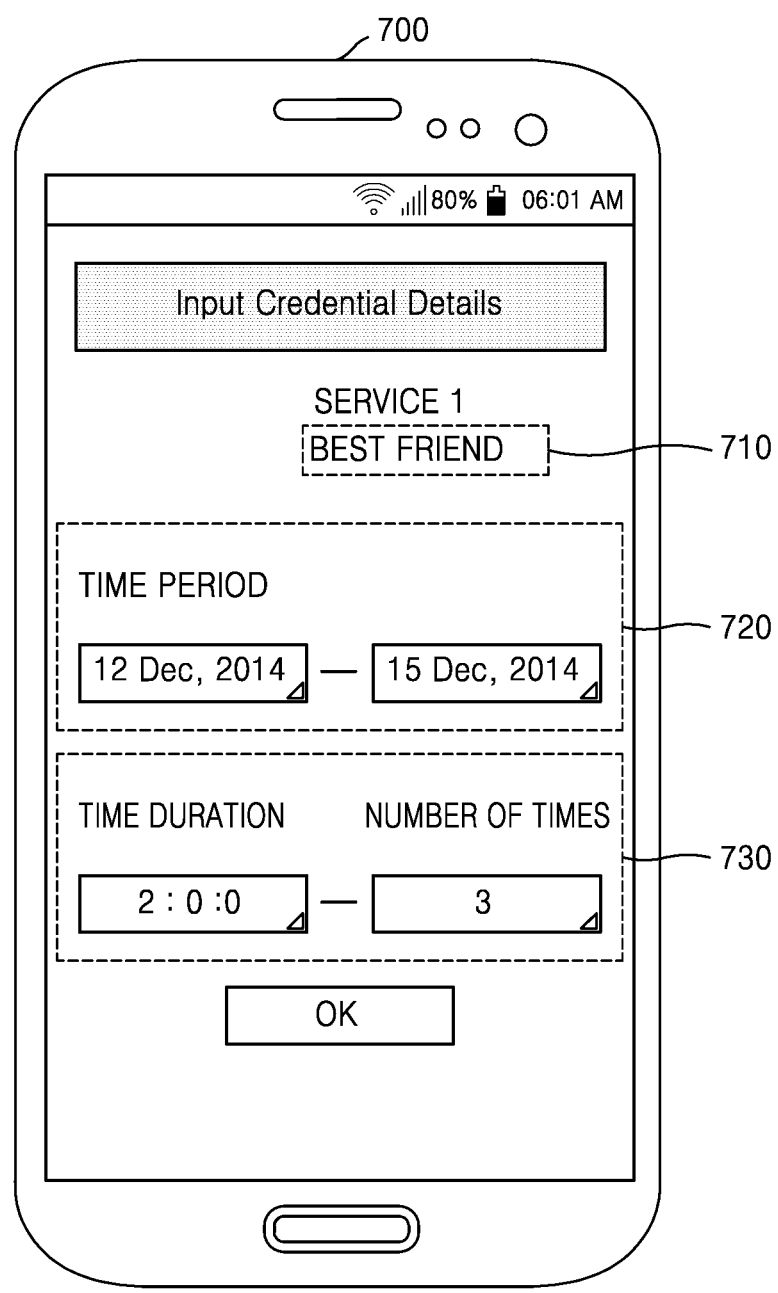
FIG. 7 illustrates a user interface for setting a validity period during which a use authority with respect to a service that is allowed for a user is shared with at least one other user according to an embodiment of the present disclosure.

FIG. 7 illustrates a user interface for setting a validity period during which a use authority with respect to a service that is allowed for a user is shared with at least one other user according to an embodiment of the present disclosure.

Referring to FIG. 7, the first terminal 700 may share a use authority with respect to a Wi-Fi service with acquaintances included in a best friend group 710 registered in an SNS service. The first terminal 700 according to the present embodiment may display a user interface including a window for receiving an input for a validity period during which the use authority with respect to the Wi-Fi service is sharable.

A window 720 for receiving an input for a time period, and a window 730 for receiving an input for a time duration and the number of times may be displayed on the user interface of the first terminal 700. The user of the first terminal 700 may share the use authority with respect to the Wi-Fi service with the acquaintances included in the best friend group 710 registered in the SNS service, three times from Dec. 12, 2014 to Dec. 15, 2014 for two hours each time.

However, the disclosure is not limited thereto, and a validity period during which a use authority with respect to a service is sharable between the user of the first terminal 700 and another user is not limited to a time period, a time duration, and the number of times. The user of the first terminal 700 may set the validity period during which the use authority with respect to the service is shared with the other user by setting at least one of the time period, the time duration, and the number of times.

Figure 8:
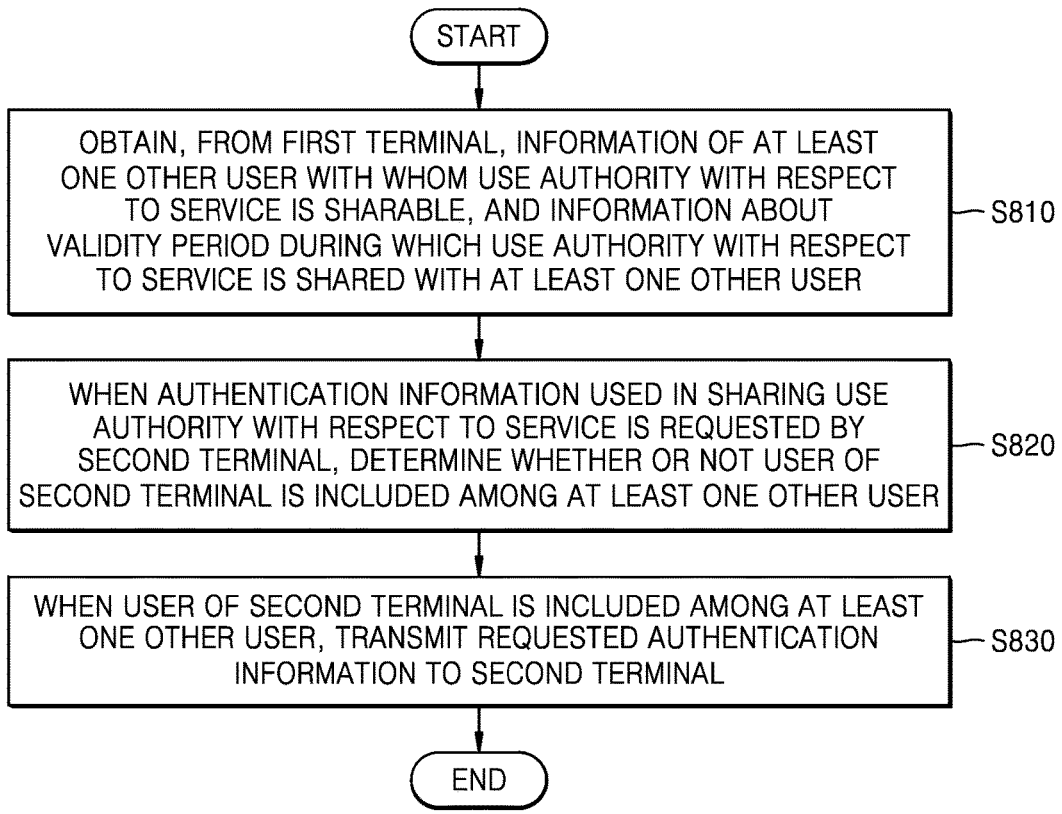
FIG. 8 is a flowchart of a method of setting a use authority with respect to a service so as to allow the use authority with respect to the service that is allowed for a user of a first terminal to be shared with a user of a second terminal according to an embodiment of the present disclosure.

FIG. 8 is a flowchart of a method of setting a use authority with respect to a service so as to allow the use authority with respect to the service that is allowed for a user of a first terminal to be shared with a user of the second terminal according to an embodiment of the present disclosure.

Referring to FIG. 8, in operation S810, the authorization server 200 obtains, from the first terminal, information of at least one other user with whom the use authority with respect to the service is sharable, and information about a validity period during which the use authority with respect to the service is shared with the at least one other user.

The authorization server 200 according to the present embodiment may receive a sharing request with respect to the use authority with respect to the service from the first terminal 100. Therefore, the authorization server 200 may request the first terminal 100 for user authentication information. Since the user authentication information is requested by the authorization server 200, the first terminal 100 may display a message window for requesting an input for the user authentication information on a screen of the first terminal 100. When the user authentication information is input to the first terminal 100, the first terminal 100 may transmit the input user authentication information to the authorization server 200.

Also, when the user authentication information received from the first terminal 100 corresponds to pre-stored user authentication information, the authorization server 200 may request the first terminal 100 for information required for the user of the first terminal 100 to share the use authority with respect to the service with the at least one other user. When the first terminal 100 receives, from the authorization server 200, the request for the information for sharing the use authority with respect to the service, the first terminal 100 may display a user interface for receiving an input for the information. Here, the information for sharing the use authority with respect to the service may include the information of the at least one other user with whom the use authority with respect to the service is to be shared by the user of the first terminal 100, the information about the validity period during which the use authority with respect to the service is shared with the at least one other user, and the like.

The user of the first terminal 100 may input, to the displayed user interface, the information of the at least one other user with whom the use authority with respect to the service is to be shared by the user of the first terminal 100 and the information about the validity period during which the use authority with respect to the service is shared with the at least one other user. Accordingly, the first terminal 100 may transmit the input information to the authorization server 200.

In operation S820, when authentication information used in sharing the use authority with respect to the service is requested by the second terminal 300, the authorization server 200 may determine whether or not a user of the second terminal 300 is included in the at least one other user.

The authorization server 200 may receive, from the second terminal 300, an authentication information request for requesting authentication information used in sharing the use authority with respect to the service. Here, the authentication information request may include identifier information of a user of the second terminal 300. For example, the authentication information request may include an identifier, a password, and the like of the second terminal 300.

Based on the identifier information of the user of the second terminal 300 which is included in the received authentication information request, the authorization server 200 may check whether or not the user of the second terminal 300 is included in the at least one other user with whom the use authority with respect to the service is to be shared by the user of the first terminal 100.

In operation S830, when the user of the second terminal 300 is included in the at least one other user, the authorization server 200 may transmit the requested authentication information to the second terminal 300.

The authentication information according to the present embodiment may be different from the user authentication information registered by the user of the first terminal 100 so as to use the service. For example, an access token, or the like may be used as the authentication information. The authorization server 200 may not transmit the user authentication information registered by the user of the first terminal 100 but may transmit the authentication information different from the user authentication information, so that the authorization server 200 may share the use authority with respect to the service of the user and may also increase security of the user authentication information.

However, the disclosure is not limited to the present embodiment, and according to another embodiment, the user authentication information registered by the user of the first terminal 100 may be transmitted to the second terminal 300. For example, when reliability of the user of the second terminal 300 is determined to be equal to or greater than a preset level, the authorization server 200 may transmit, to the second terminal 300, the user authentication information registered by the user of the first terminal 100.

When the authentication information is transmitted from the authorization server 200 to the second terminal 300, the user of the second terminal 300 may obtain the use authority with respect to the service during the validity period. Accordingly, the service may be provided to the second terminal 300 during the validity period, based on the use authority with respect to the service.

Figure 9:
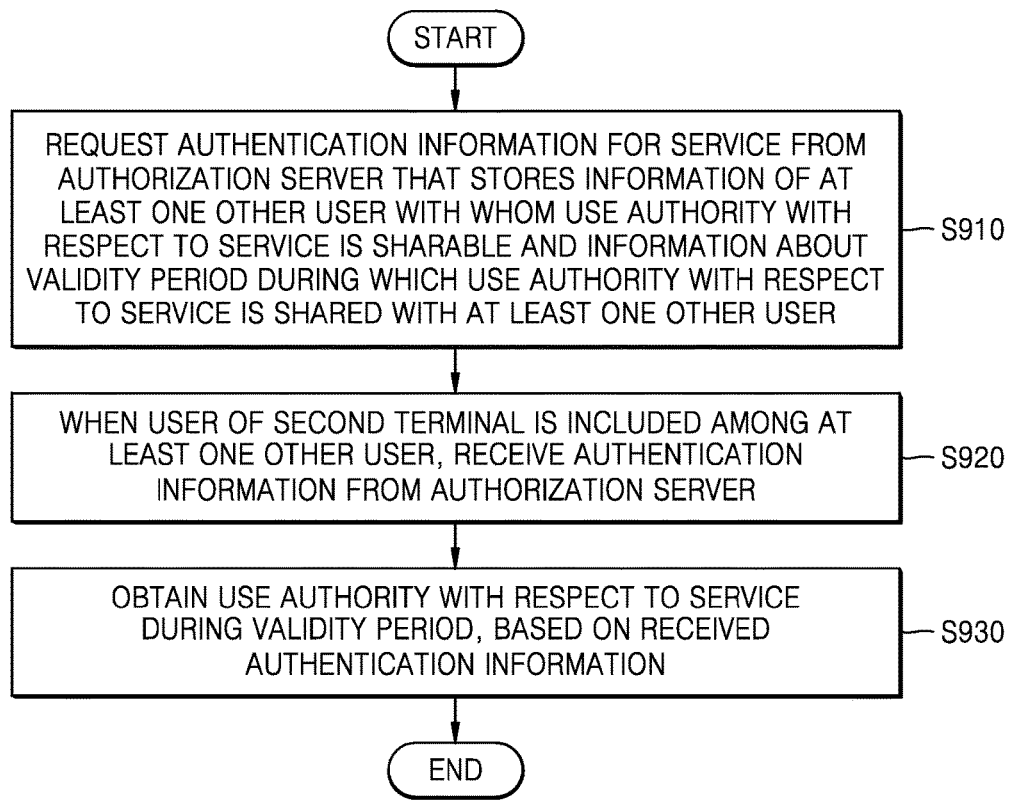
FIG. 9 is a flowchart of a method of sharing a use authority with respect to a service of a user of a first terminal according to an embodiment of the present disclosure.

FIG. 9 is a flowchart for describing a method of sharing a use authority with respect to a service of a user of a first terminal according to an embodiment of the present disclosure.

Referring to FIG. 9, in operation S910, the second terminal 300 requests authentication information for a service from the authorization server 200 that stores information of at least one other user with whom a use authority with respect to a service is sharable and information about a validity period during which the use authority with respect to the service is shared with the at least one other user.

The second terminal 300 according to the present embodiment may transmit, to the authorization server 200, an authentication information request for sharing the use authority with respect to the service that is allowed for a user of the first terminal 100. Here, the authentication information request may include identifier information of a user of the second terminal 300. For example, in a case where the user of the second terminal 300 selects a particular service and then inputs an identifier and password of the user of the second terminal 300, the second terminal 300 may transmit, to the authorization server 200, the input identifier and password of the user of the second terminal 300 which are input with respect to the particular service.

In operation S920, when the user of the second terminal 300 is included in the at least one other user, the second terminal 300 receives authentication information from the authorization server 200.

When the authorization server 200 determines that the user of the second terminal 300 is a user who is authorized by the user of the first terminal 100, the second terminal 300 may receive the authentication information from the authorization server 200. The authorization server 200 may previously store identifier information of the at least one other user for whom the user of the first terminal 100 authorized sharing the use authority with respect to the service.

In operation S930, the second terminal 300 obtains the use authority with respect to the service during the validity period, based on the received authentication information.

The second terminal 300 may transmit the received authentication information to a service providing apparatus that provides the service. Here, the received authentication information may be deleted from the second terminal 300 when the validity period expires. As another example, when the validity period expires, the service providing apparatus may determine the received authentication information as invalid information.

Figure 10:
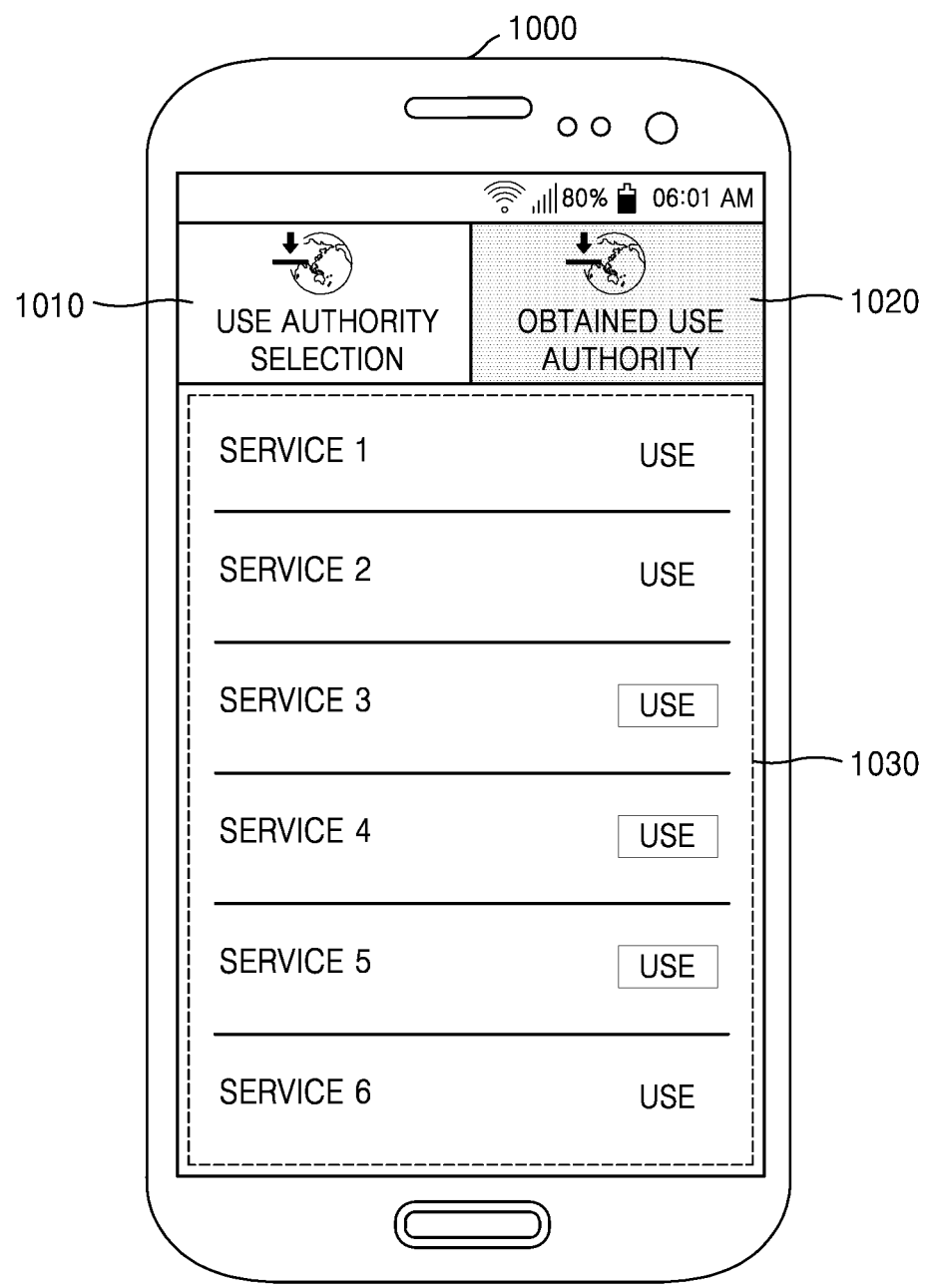
FIG. 10 illustrates a screen of a second terminal which is related to a method of providing a user interface for selecting a service with respect to which use authority is shared with another user according to an embodiment of the present disclosure.

FIG. 10 illustrates a screen of a second terminal which is related to a method of providing a user interface for selecting a service with respect to which use authority is shared with another user according to an embodiment of the present disclosure.

Referring to FIG. 10, when a user of the second terminal 1000 selects an obtained use authority tab 1020 from among a use authority selecting tab 1010 and the obtained use authority tab 1020, the second terminal 1000 may display a list 1030 of services for which sharing of use authorities is allowed for the user of the second terminal 1000, by at least one other user.

The user of the second terminal 1000 may select at least one service from among the services included in the list 1030. For example, when a use tab displayed next to identifier information of the service is touched, the particular service may be selected in the second terminal 1000.

When the user of the second terminal 1000 according to the present embodiment selects a Wi-Fi service, the second terminal 1000 may transmit an authentication information request with respect to the Wi-Fi service to the authorization server 200. Here, the authentication information request with respect to the Wi-Fi service may include identifier information of the user of the second terminal 1000.

The authorization server 200 may obtain the identifier information of the user of the second terminal 1000 which is included in the authentication information request received from the second terminal 1000. Based on the obtained identifier information of the user of the second terminal 1000, the authorization server 200 may determine whether or not the user of the second terminal 1000 is included in at least one other user for whom sharing of a use authority with respect to the Wi-Fi service is allowed by a user of the first terminal 100.

When the user of the second terminal 1000 is included in the at least one other user for whom sharing of the use authority with respect to the Wi-Fi service is allowed by the user of the first terminal 100, the second terminal 1000 may receive authentication information from the authorization server 200.

When the user of the second terminal 1000 selects the use authority selecting tab 1010, the second terminal 1000 may display a user interface for receiving an input for information for allowing a use authority with respect to a service to be shared with another user, wherein the use authority with respect to the service is allowed for the user of the second terminal 1000. In this case, the second terminal 1000 may operate to correspond to the first terminal 100 described with reference to FIG. 1.

Figure 11:
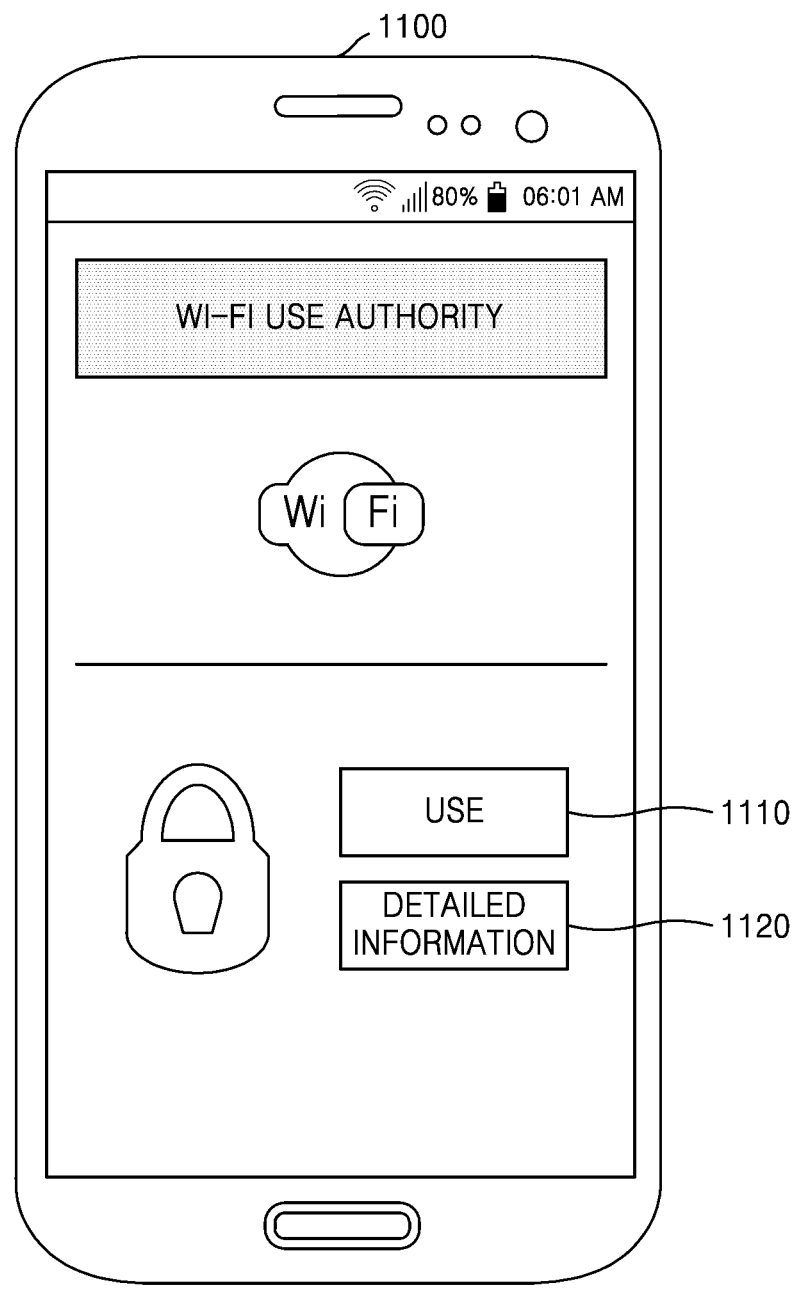
FIG. 11 illustrates a user interface that is displayed when a second terminal requests a user of a first terminal to share a use authority with respect to a service that is allowed for the user of the first terminal according to an embodiment of the present disclosure.

FIG. 11 illustrates a user interface that is displayed when a second terminal requests a user of a first terminal to share a use authority with respect to a service that is allowed for the user of the first terminal according to an embodiment of the present disclosure.

Referring to FIG. 11, a user of the second terminal 1100 may select the Wi-Fi service on the user interface described with reference to FIG. 10. Accordingly, a user interface associated with sharing of a use authority with respect to the Wi-Fi service may be displayed on a screen of the second terminal 1100.

The user interface of the second terminal 1100 may include a use button 1110 for requesting execution of the Wi-Fi service, and a detailed information button 1120 for checking detailed information of a use authority shared with the user of the second terminal 1100.

For example, when the user of the second terminal 1100 selects the use button 1110, the second terminal 1100 may transmit, to a Wi-Fi service providing apparatus, authentication information received from the authorization server 200. As another example, when the user of the second terminal 1100 selects the detailed information button 1120, the user interface of the second terminal 1100 may display information of the user of the first terminal 100 for which Wi-Fi service is allowed, and information about a validity period during which the use authority with respect to the Wi-Fi service is sharable with the second terminal 1100. This will be described at a later time with reference to FIG. 12.

Figure 12:
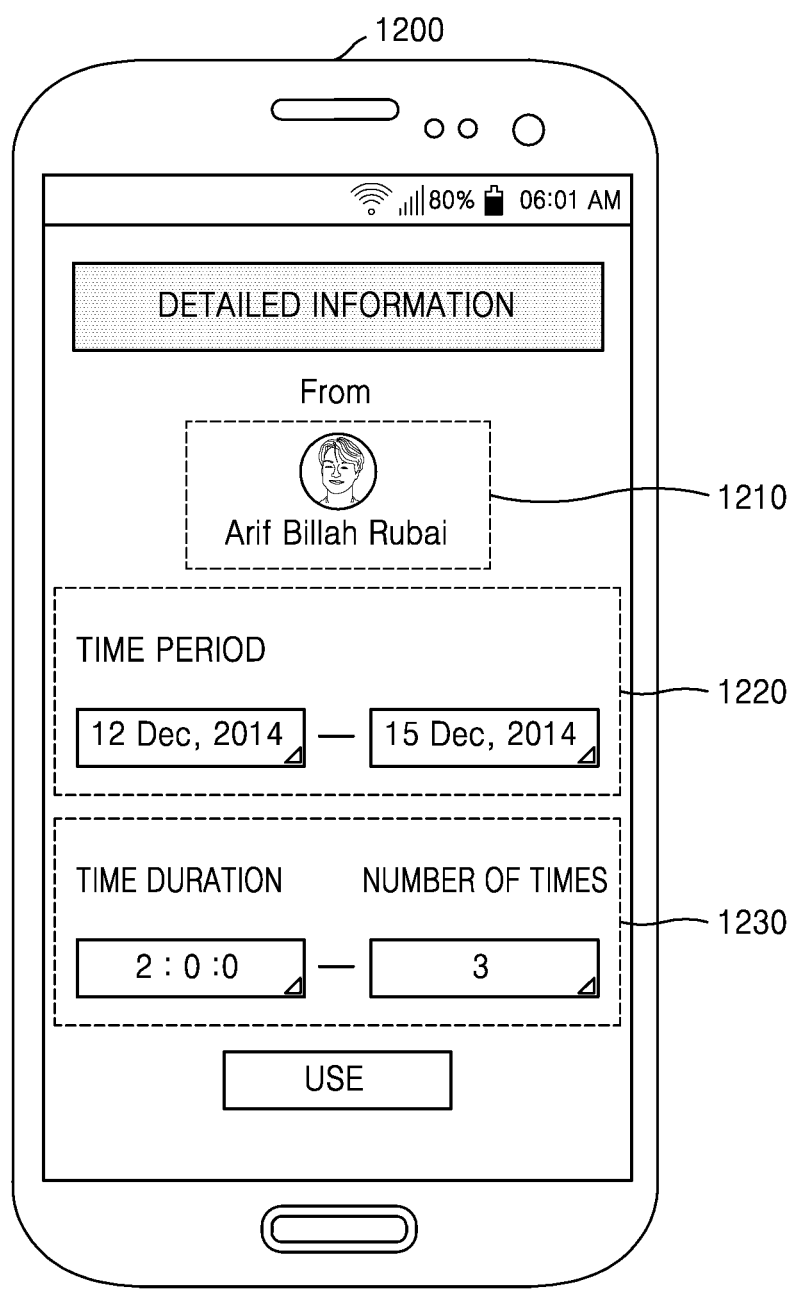
FIG. 12 illustrates a user interface that displays detailed information about a use authority with respect to a service which is shared with a user of a second terminal according to an embodiment of the present disclosure.

FIG. 12 illustrates a user interface that displays detailed information about a use authority with respect to a service which is shared with a user of a second terminal 1200, according to an embodiment of the present disclosure.

Referring to FIG. 12, the second terminal 1200 may display detailed information about a use authority with respect to a Wi-Fi service which is allowed to be shared by a user of the first terminal 100. Here, the detailed information about the use authority with respect to the Wi-Fi service may include information 1210 of the user of the first terminal 100 and two pieces of validity period information 1220 and 1230.

For example, the second terminal 1200 may display, on the user interface, information indicating that the use authority with respect to the Wi-Fi service that is allowed for Arif Billah Rubai who is the user of the first terminal 100 is shared. Also, the second terminal 1200 may display, on the user interface, information about a validity period during which the use authority with respect to the Wi-Fi service is sharable three times from Dec. 12, 2014 to Dec. 15, 2014 for two hours each time.

Figure 13:
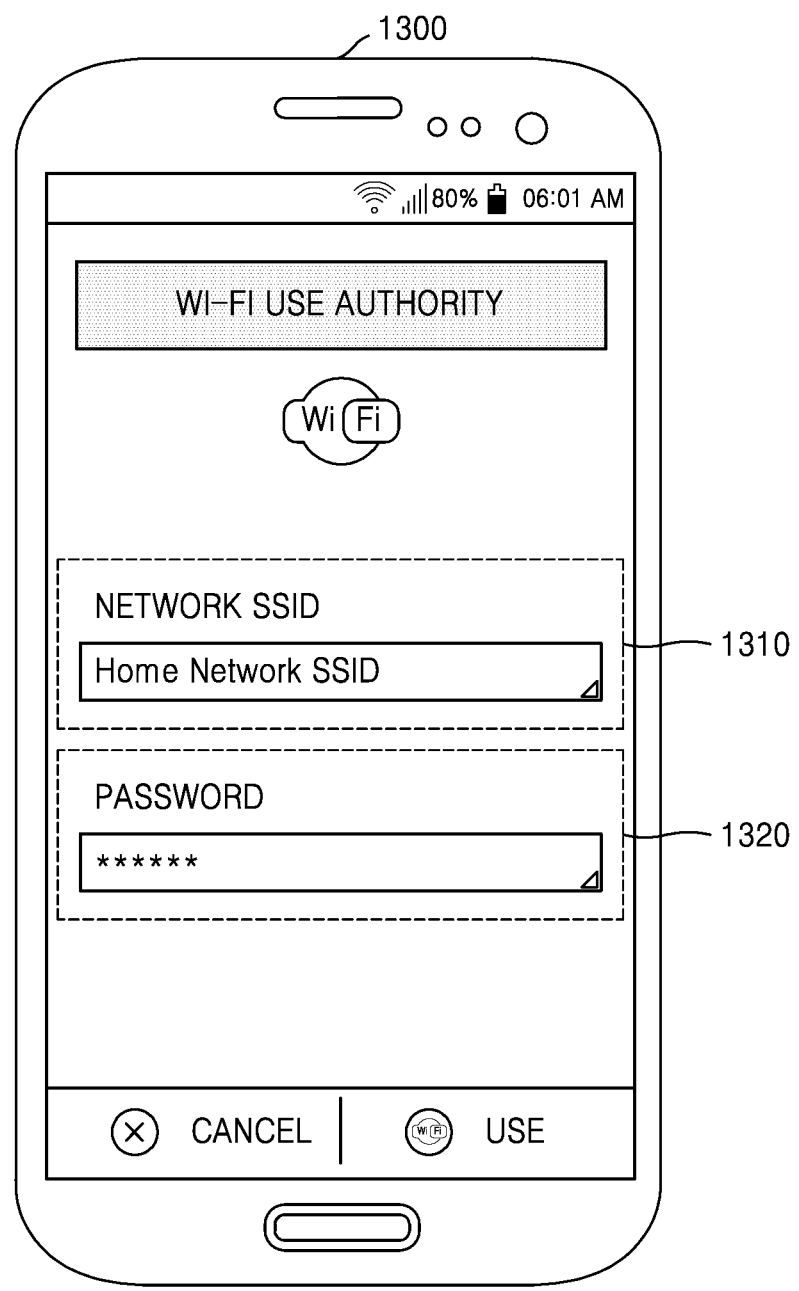
FIG. 13 illustrates a screen of a second terminal which is related to a method of receiving a Wireless Fidelity (Wi-Fi) service based on authentication information received by the second terminal according to an embodiment of the present disclosure.

FIG. 13 illustrates a screen of a second terminal which is related to a method of receiving a Wi-Fi service based on authentication information received by the second terminal according to an embodiment of the present disclosure.

Referring to FIG. 13, a user of the second terminal 1300 according to the present embodiment may select the Wi-Fi service from among at least one service displayed on a user interface of the second terminal 1300. Here, it is assumed that the Wi-Fi service is allowed for a user of the first terminal 100 and is not allowed for the user of the second terminal 1300. Accordingly, in order for the user of the second terminal 1300 to use the Wi-Fi service, the user of the second terminal 1300 may share a use authority that is allowed for the user of the first terminal 100.

When the user of the second terminal 1300 selects the Wi-Fi service, the second terminal 1300 may request the authorization server 200 for authentication information with respect to the Wi-Fi service. Based on identifier information of the user of the second terminal 1300 which is included in the request for the authentication information received from the second terminal 1300, the authorization server 200 may determine whether or not the user of the second terminal 1300 is included among at least one pre-stored user. Here, information of the at least one pre-stored user may be transmitted from the first terminal 100 to the authorization server 200 and may be stored in a memory of the authorization server 200.

When the user of the second terminal 1300 is included among the at least one pre-stored user, the authorization server 200 may transmit authentication information used in sharing a use authority with respect to the Wi-Fi service to the second terminal 1300. Referring to FIG. 13, the authentication information used in sharing the use authority with respect to the Wi-Fi service may include network service set identifier (SSID) information 1310 and a password 1320. However, the disclosure is not limited thereto, and thus, authentication information used in sharing a use authority with respect to a service may differ according to types of the service.

Figure 14:
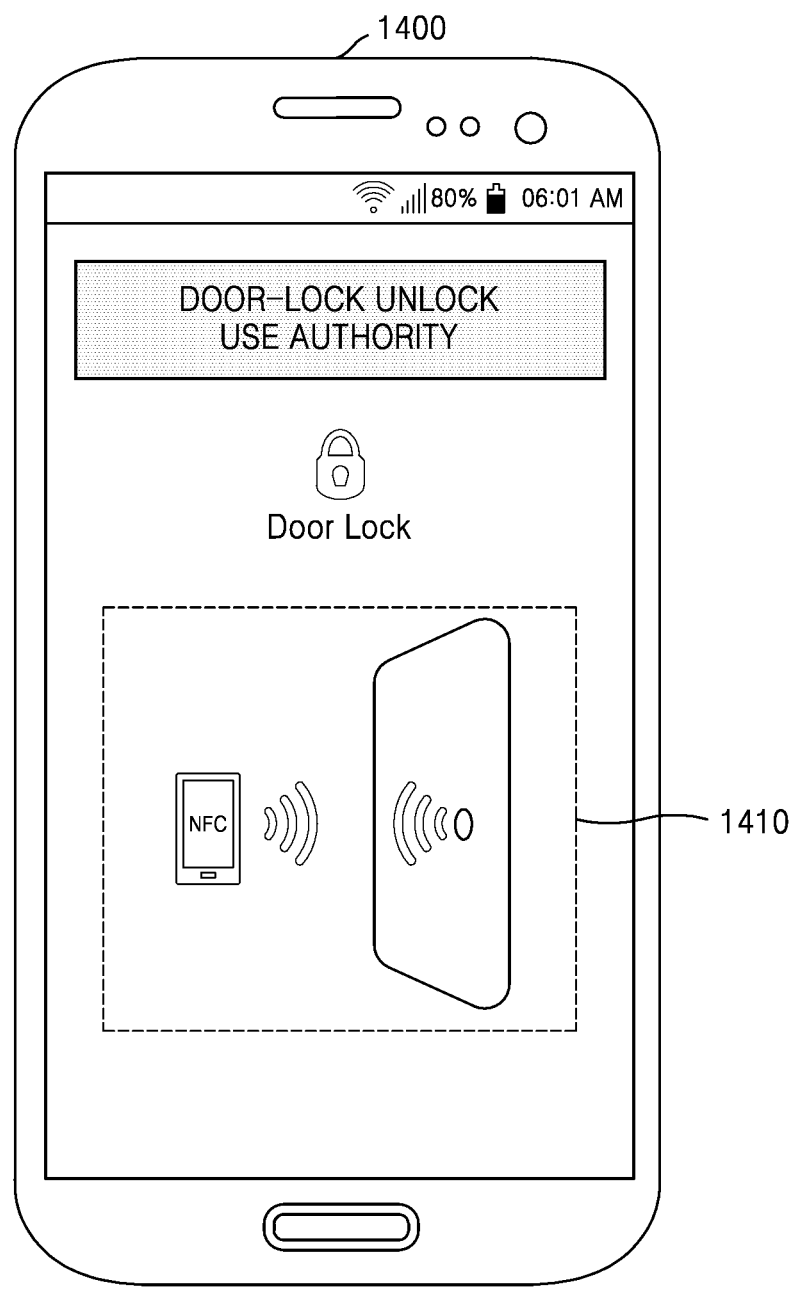
FIG. 14 illustrates a screen of a second terminal which is related to a method of receiving a door-lock unlock service based on authentication information received by the second terminal according to an embodiment of the present disclosure.

FIG. 14 illustrates a screen of a second terminal which is related to a method of receiving a door-lock unlock service based on authentication information received by the second terminal according to an embodiment of the present disclosure.

Referring to FIG. 14, a user of the second terminal 1400 according to the present embodiment may select a door-lock unlock service from among at least one service displayed on a user interface of the second terminal 1400. Here, it is assumed that the door-lock unlock service is allowed for a user of the first terminal 100 and is not allowed for the user interface of the second terminal 1400. Accordingly, in order for the user of the second terminal 1400 to use the door-lock unlock service, a use authority with respect to a service that is allowed for the user of the first terminal 100 may be shared.

When the user of the second terminal 1400 selects the door-lock unlock service, the second terminal 1400 may transmit an authentication information request for the door-lock unlock service to the authorization server 200. The authorization server 200 may determine whether or not the user of the second terminal 1400 is included among at least one pre-stored user, based on identifier information of the user of the second terminal 1400 which is included in the authentication information request received from the second terminal 1400. Here, information of the at least one pre-stored user may be transmitted from the first terminal 100 to the authorization server 200 and may be stored in a memory of the authorization server 200.

When the user of the second terminal 1400 is included among the at least one pre-stored user, the authorization server 200 may transmit, to the second terminal 1400, authentication information 1410 used in sharing a use authority with respect to the door-lock unlock service. Referring to FIG. 14, when the authentication information 1410 used in sharing the door-lock unlock service is received, the user of the second terminal 1400 may tag the second terminal 1400 to a door-lock system and may unlock a door-lock.

Figure 15:
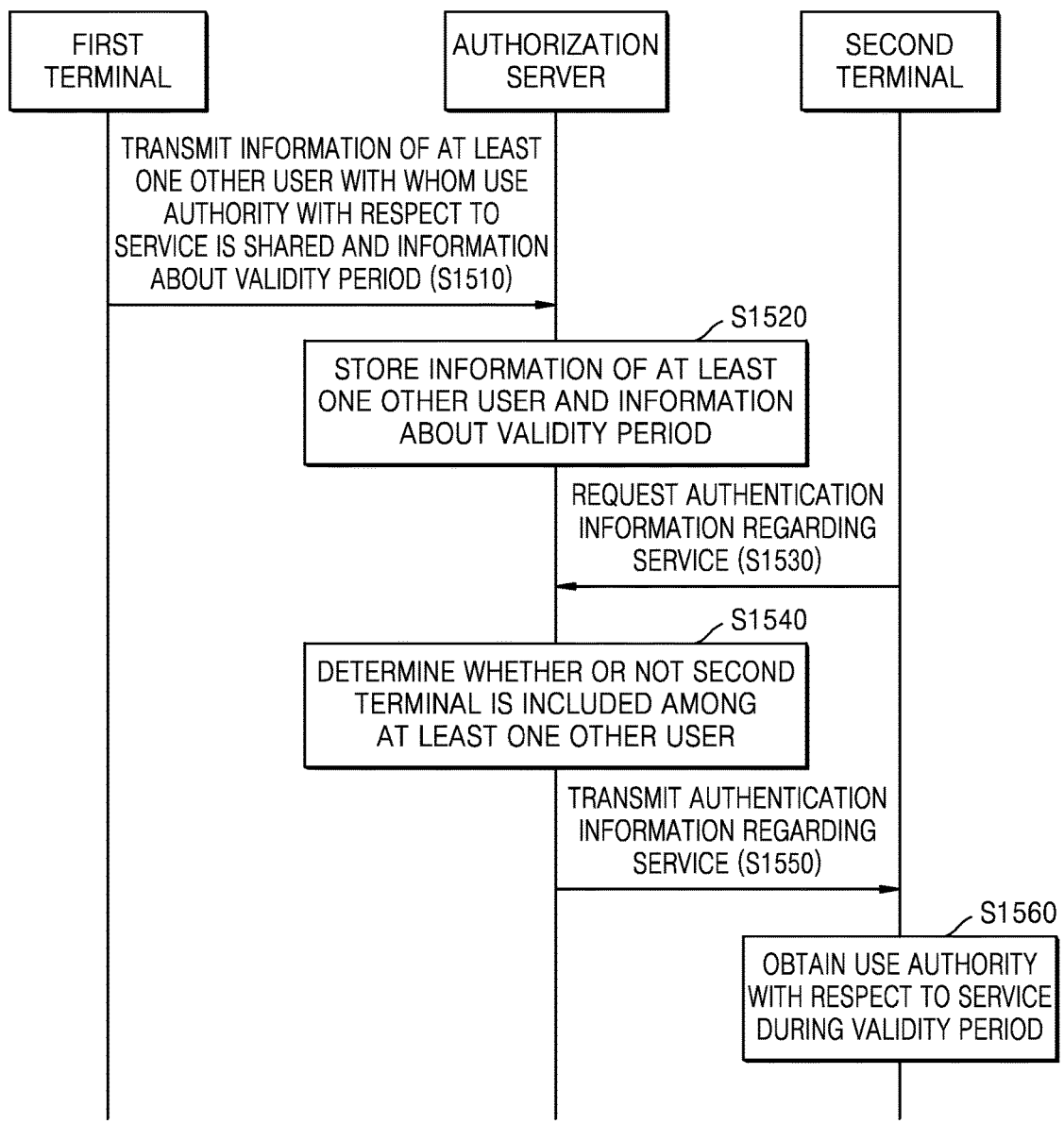
FIG. 15 is a flowchart of a method of sharing a use authority with respect to a service among a first terminal, an authorization server, and a second terminal in a use authority system according to an embodiment of the present disclosure.

FIG. 15 is a flowchart for describing a method of sharing a use authority with respect to a service among a first terminal, an authorization server, and a second terminal in a use authority system according to an embodiment of the present disclosure.

Referring to FIG. 15, in operation S1510, the first terminal may transmit, to the authorization server, information of at least one other user with whom a use authority with respect to a service that is allowed for a user of the first terminal is shared and information about a validity period during which the use authority with respect to the service is shared with the at least one other user.

In operation S1520, the authorization server may store the information of the at least one other user with whom the use authority with respect to the service that is allowed for the user of the first terminal is shared and the information about the validity period during which the use authority with respect to the service is shared with the at least one other user, wherein the two pieces of information are received from the first terminal.

In operation S1530, the second terminal may request the authorization server for authentication information used in sharing the use authority with respect to the service that is allowed for the user of the first terminal.

In operation S1540, the authorization server may determine whether or not a user of the second terminal is included in the at least one other user.

The authorization server according to the present embodiment may determine whether or not the user of the second terminal is included in the at least one other user, based on the pre-stored information of the at least one other user with whom the use authority with respect to the service that is allowed for the user of the first terminal is sharable.

In operation S1550, the authorization server may transmit the authentication information regarding the service to the second terminal.

When the second terminal is included in at least one terminal, the authorization server may transmit the authentication information regarding the service to the second terminal.

In operation S1560, the second terminal may obtain the use authority with respect to the service during the validity period.

The second terminal according to the present embodiment may receive the service by sharing the use authority with respect to the service during the validity period that is allowed by the user of the first terminal.

Figure 16:
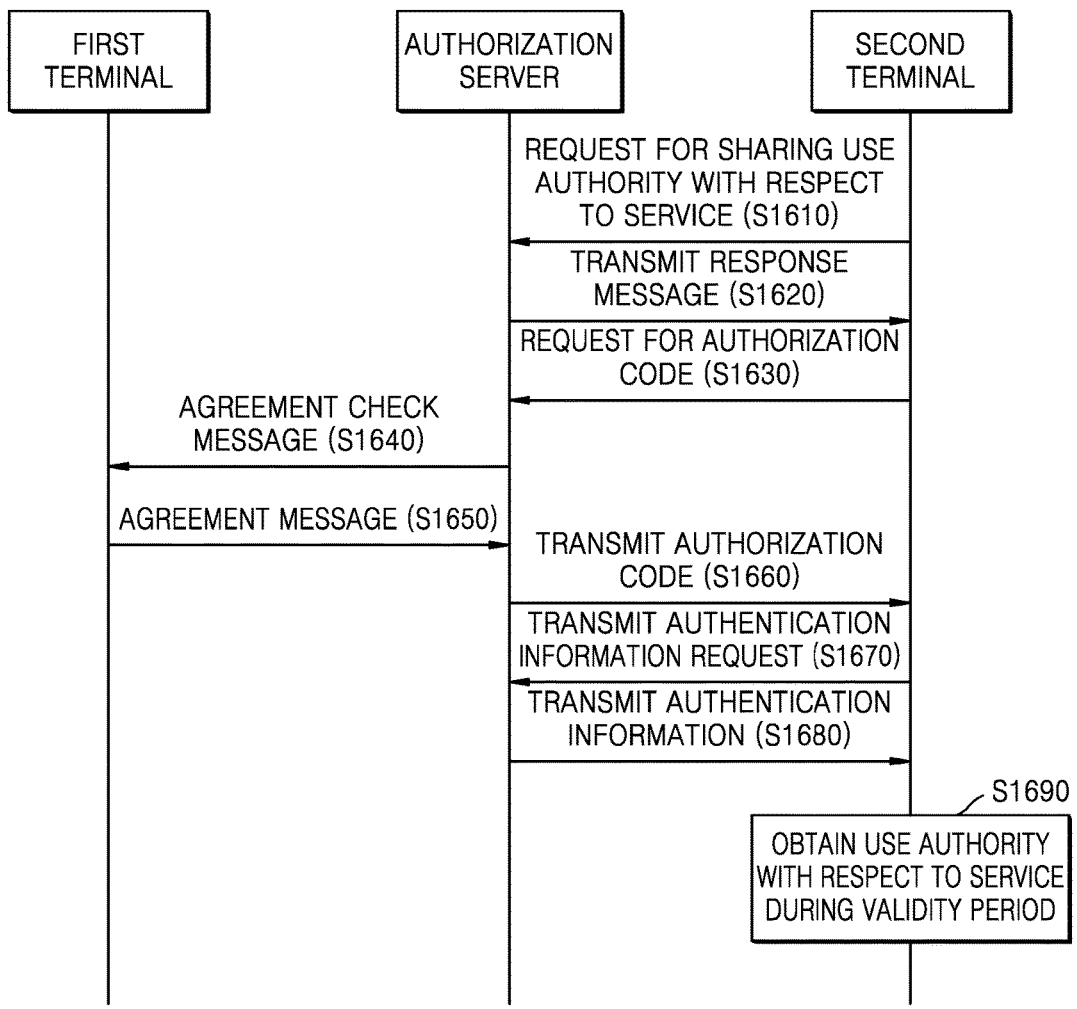
FIG. 16 is a flowchart of a method of sharing a use authority with respect to a service among a first terminal, an authorization server, and a second terminal in a use authority system according to an embodiment of the present disclosure.

FIG. 16 is a flowchart for describing a method of sharing a use authority with respect to a service among a first terminal, an authorization server, and a second terminal in a use authority system according to an embodiment of the present disclosure.

Referring to FIG. 16, in operation S1610, the second terminal may request the authorization server for sharing of a use authority with respect to a service of the first terminal. Here, the request for sharing the use authority may include an identifier and password of the second terminal which are registered in the authorization server.

In operation S1620, the authorization server may transmit a response message with respect to the request for sharing the use authority to the second terminal. The response message may include an authentication code input window for receiving an input for an authentication code for verifying that a user of the second terminal is a user who is registered in the authorization server. For example, a PIN code may be used as the authentication code for verifying that the user of the second terminal is the user who is registered in the authorization server.

In operation S1630, the second terminal may request the authorization server for an authorization code. For example, when the user of the second terminal inputs the authentication code to the authentication code input window that is displayed when the second terminal receives the response message from the authorization server, the second terminal may transmit an authorization code request message including the input authentication code.

In operation S1640, when the authorization server receives the authorization code request message, the authorization server may transmit, to the first terminal, an agreement check message with respect to whether or not the use authority with respect to the service is allowed for the user of the second terminal.

In operation S1650, when the first terminal obtains, from a user of the first terminal, an input for allowing sharing of the use authority with respect to the service for the user of the second terminal, the first terminal may transmit, to the authorization server, an agreement message indicating that the use authority with respect to the service is allowed for the user of the second terminal.

In operation S1660, when the authorization server receives the agreement message from the first terminal, the authorization server may transmit the authorization code to the second terminal.

In operation S1670, the second terminal may transmit, to the authorization server, an authentication information request including the received authorization code, identification information about the service with respect to which use authority is to be shared, or the like.

In operation S1680, when the authorization code received from the second terminal corresponds to the authorization code transmitted from the authorization server to the second terminal, the authorization server may transmit authentication information to the second terminal.

In operation S1690, the second terminal may obtain the use authority with respect to the service that is allowed for the user of the first terminal, by using the received authentication information.

Figure 17:
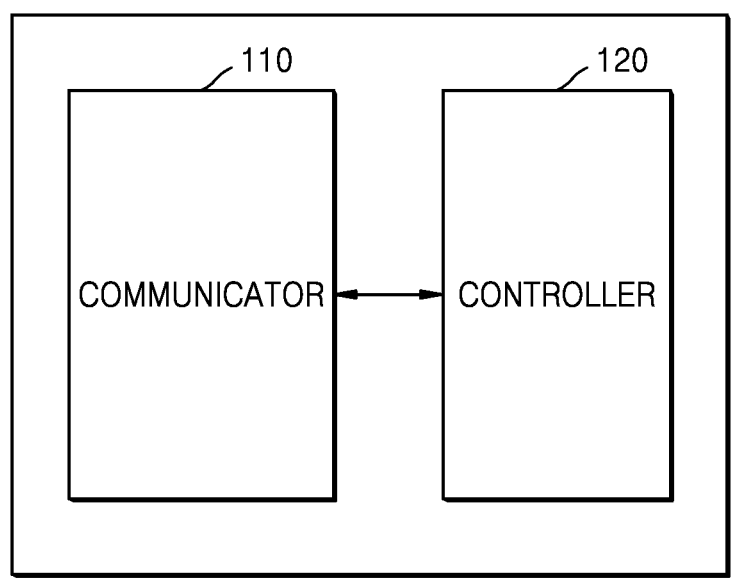
FIGS. 17 and 18 illustrate block diagrams of a first terminal according to various embodiments of the present disclosure.
Figure 18:
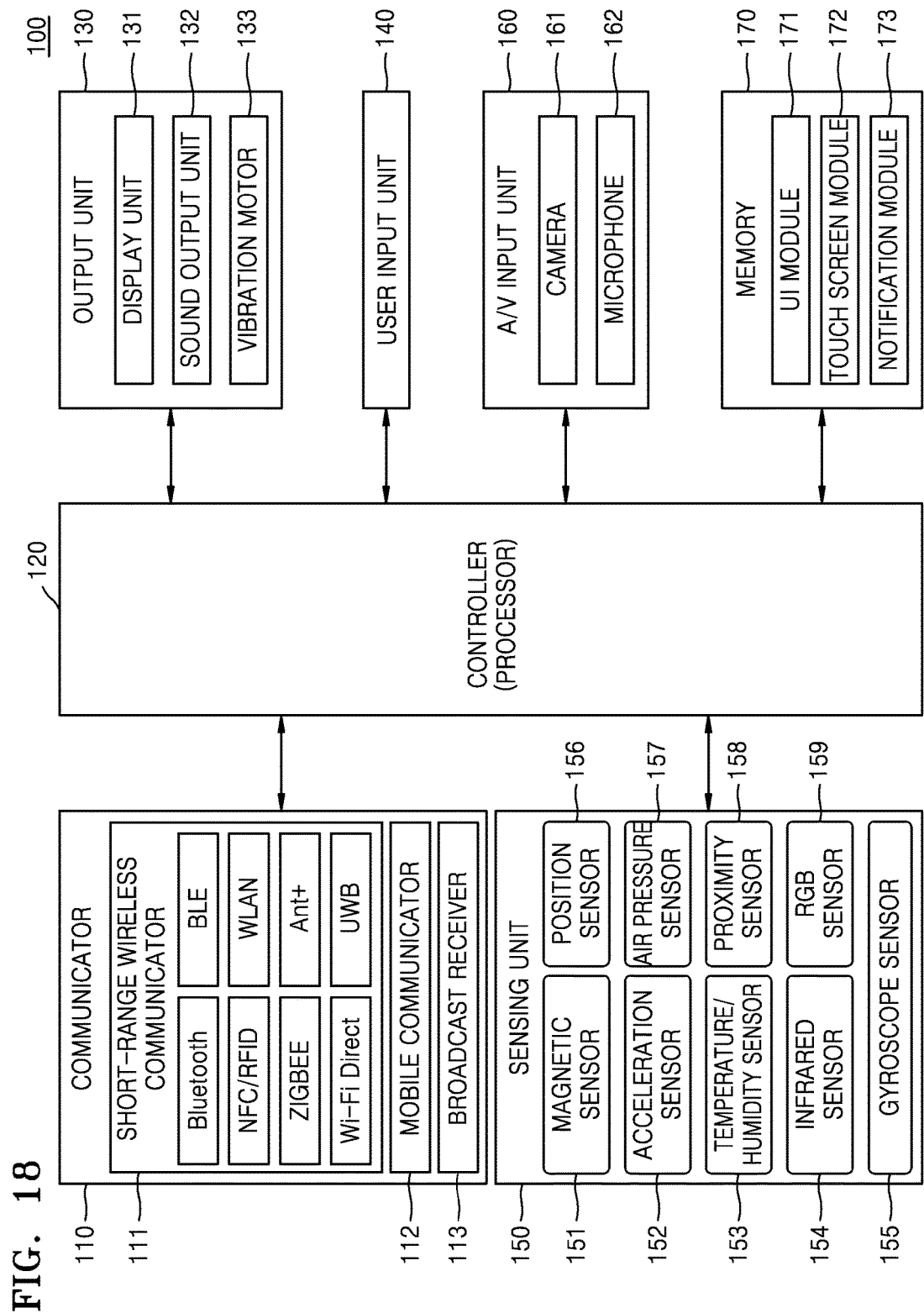

FIGS. 17 and 18 illustrate block diagrams of a first terminal according to various embodiments of the present disclosure.

Referring to FIG. 17, the first terminal 100 may include a communicator 110 and a controller 120 (also referred to as a processor 120). However, not all shown elements are necessary elements. That is, the first terminal 100 may be embodied with more elements than the shown elements or may be embodied with fewer elements than the shown elements.

Referring to FIG. 18, the first terminal 100 may further include an output unit 130, a user input unit 140, a sensing unit 150, an audio/video (A/V) input unit 160, and a memory 170, in addition to the communicator 110 and the controller 120.

Hereinafter, the elements are sequentially described below.

The communicator 110 may transmit, to the authorization server 200, identifier information of at least one other user with whom a use authority with respect to a service that is allowed for a user of the first terminal 100 is to be shared. The communicator 110 may also transmit, to the authorization server 200, information about a validity period during which the use authority with respect to the service is shared with the at least one other user.

According to another embodiment, the communicator 110 may receive, from the authorization server 200, an agreement message for checking whether to share the use authority with respect to the service with a user of the second terminal 300. With respect to the agreement message received from the authorization server 200, the communicator 110 may transmit a response message indicating whether to agree to share the use authority with respect to the service with the user of the second terminal 300.

The communicator 110 may include one or more elements allowing communication between the first terminal 100 and other devices. Here, the other devices may include the authorization server 200 and the second terminal 300. For example, the communicator 110 may include a short-range wireless communicator 111, a mobile communicator 112, and a broadcast receiver 113.

The short-range wireless communicator 111 may include, but is not limited to, a Bluetooth (BT) communicator, a Bluetooth low energy (BLE) communicator, a near field communication (NFC) unit, a wireless local area network (WLAN) communicator, a ZigBee communicator, an infrared Data Association (IrDA) communicator, a Wi-Fi Direct (WFD) communicator, an ultra wideband (UWB) communicator, and an Ant+ communicator.

The mobile communicator 112 exchanges a wireless signal with at least one of a base station, an external terminal, and a server on a mobile communication network. The wireless signal may include various types of data according to communication of a sound call signal, a video call signal, or a text/multimedia message.

The broadcast receiver 113 receives a broadcast signal and/or information related to a broadcast from the outside through a broadcast channel. The broadcast channel may include a satellite channel and a ground wave channel. In another embodiment, the first terminal 100 may not include the broadcast receiver 113.

The controller 120 generally controls all operations of the first terminal 100. For example, the controller 120 may control the communicator 110, the output unit 130, the user input unit 140, the sensing unit 150, the A/V input unit 160, and the memory 170 by executing programs stored in the memory 170.

The controller 120 may determine, based on an input by the user of the first terminal 100, the at least one other user with whom the use authority with respect to the service that is allowed for the user is sharable. In addition, the controller 120 may determine the validity period during which the use authority is shared with the at least one other user.

The output unit 130 may output a text, an image signal, an audio signal, or a vibration signal, and may include a display unit 131, a sound output unit 132, a vibration motor 133, or the like.

When user authentication information indicating the user is obtained via the user input unit 140, the display unit 131 may display a user interface for receiving an input for information of the at least one other user with whom the use authority with respect to the service is to be shared.

The display unit 131 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

The display unit 131 and a touch pad may form a mutual layer structure and then may be formed as a touch screen. The display unit 131 may include at least one of liquid crystal display (LCD), a thin film transistor-liquid crystal display (TFT-LCD), n organic light-emitting diode (OLED) display, a flexible display, a three-dimensional (3D) display, and an electrophoretic display. According to a type of the first terminal 100, the first terminal 100 may include at least two display units 131.

The sound output unit 132 may output audio data that is received from the communicator 110 or is stored in the memory 170. The sound output unit 132 may also output a sound signal (e.g., a call signal receiving sound, a message receiving sound, a notifying sound, or the like) related to capabilities performed by the first terminal 100. The sound output unit 132 may include a speaker, a buzzer, or the like.

The vibration motor 133 may output a vibration signal. For example, the vibration motor 133 may output the vibration signal that corresponds to an output of the audio data (e.g., the call signal receiving sound, the message receiving sound, or the like) or video data. When a touch is input to the touch screen, the vibration motor 133 may output a vibration signal.

The user input unit 140 may indicate a unit by which a user inputs data so as to control the first terminal 100. For example, the user input unit 140 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

According to the embodiment, based on a user input sensed via the user input unit 140, the at least one other user with whom the use authority with respect to the service that is allowed for the user is to be shared may be determined. In addition, based on the user input sensed via the user input unit 140, the validity period during which the use authority with respect to the service is shared with the at least one other user may be set.

The sensing unit 150 may sense a state of the first terminal 100 or a status around the first terminal 100 and may transfer sensed information to the controller 120.

The sensing unit 150 may include, but is not limited to, at least one of a magnetic sensor 151, an acceleration sensor 152, a temperature/humidity sensor 153, an infrared sensor 154, a gyroscope sensor 155, a position sensor 156 (e.g., a global positioning system (a GPS sensor)), an air pressure sensor 157, a proximity sensor 158, and a red green blue (RGB) sensor (i.e., a luminance sensor) 159. Functions of the sensors may be intuitionally deduced by one of ordinary skill in the art by referring to names of the sensors, and thus, detailed descriptions thereof are omitted here.

The A/V input unit 160 may receive an input of an audio signal or a video signal and may include a camera 161 and a microphone 162. The camera 161 may obtain an image frame such as a still image or a moving picture via an image sensor during a video call mode or an image-capturing mode. An image that is captured via the image sensor may be processed by the controller 120 or a separate image processing unit (not shown).

The image frame that is processed by the camera 161 may be stored in the memory 170 or may be transmitted to an external source via the communicator 110. According to a configuration of the first terminal 100, two or more cameras 161 may be arranged.

The microphone 162 receives an input of an external sound signal and processes the received sound signal into electrical voice data. For example, the microphone 162 may receive a sound signal from an external device or a speaker. In order to remove noise that occurs while the sound signal is externally input, the microphone 162 may use various noise removing algorithms.

The memory 170 may store a program for processing and controlling the controller 120, and may store a plurality of pieces of data that are input to or output from the first terminal 100.

The memory 170 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The first terminal 100 may run web storage or a cloud server that performs a storage function of the memory 170 on the Internet.

The programs stored in the memory 170 may be classified into a plurality of modules according to their functions, for example, into a user interface (UI) module 171, a touch screen module 172, a notification module 173, etc.

The UI module 171 may provide a specialized UI or graphical user interface (GUI) associated with the first terminal 100 for each service.

The UI module 171 may divide a screen so as to allow a plurality of windows to be displayed thereon. The UI module 171 may display a plurality of items of data related to a plurality of services on the plurality of windows, respectively, wherein the services are executed in the first terminal 100.

The touch screen module 172 may detect a user's touch gesture on the touch screen and transmit information related to the touch gesture to the controller 120.

The touch screen module 172 according to the present embodiment may recognize and analyze a touch code. The touch screen module 172 may be configured by additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The notification module 173 may generate a signal for notifying the user about an occurrence of an event in the first terminal 100. Examples of the event that may occur in the first terminal 100 include a call signal receiving event, a message receiving event, a key signal input event, a schedule notifying event, or the like.

The notification module 173 may output an alarm signal in the form of a video signal via the display unit 131, an alarm signal in the form of an audio signal via the sound output unit 132, or an alarm signal in the form of a vibration signal via the vibration motor 133.

Figure 19:
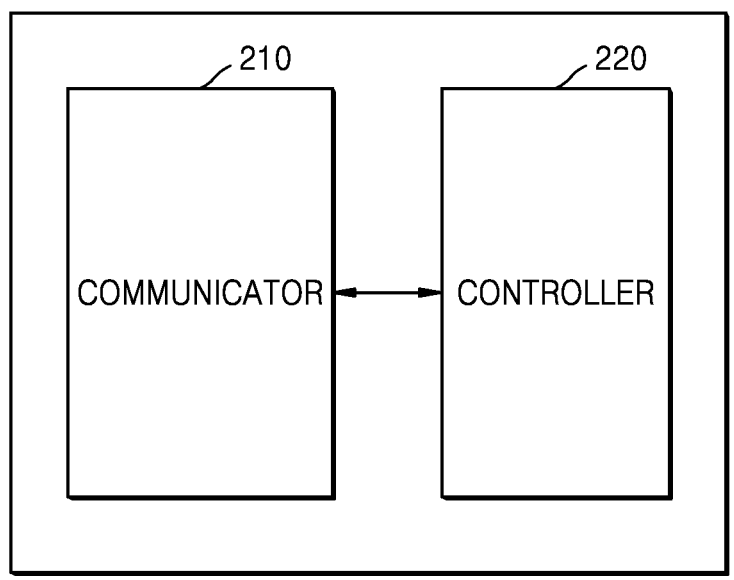
FIG. 19 is a block diagram of an authorization server according to an embodiment of the present disclosure.

FIG. 19 is a block diagram of an authorization server according to an embodiment of the present disclosure.

Referring to FIG. 19, the authorization server 200 may include a communicator 210 and a controller 220 (also referred to as a processor 220). However, not all shown elements are necessary elements. That is, the authorization server 200 may be embodied with more elements than the shown elements or may be embodied with fewer elements than the shown elements.

The communicator 210 may obtain, from the first terminal 100, identifier information of at least one other user with whom a use authority with respect to a service is sharable, and information about a validity period during which the use authority with respect to the service is shared with the at least one other user. When a user of the second terminal 300 is included in the at least one other user, the communicator 210 may transmit requested authentication information to the second terminal 300.

The communicator 210 according to the present embodiment may receive an authentication information request for the service from the second terminal 300, wherein the authentication information request includes identifier information of the user of the second terminal 300.

The communicator 210 may transmit, to the second terminal 300, information about a validity period that corresponds to the user of the second terminal 300.

When authentication information used in sharing the use authority with respect to the service is requested by the second terminal 300, the controller 220 may determine whether or not the user of the second terminal 300 is included in the at least one other user.

The controller 220 according to the present embodiment may classify the identifier information of the at least one other user to a group according to the validity period, and may store the identifier information in a memory (not shown).

Figure 20:
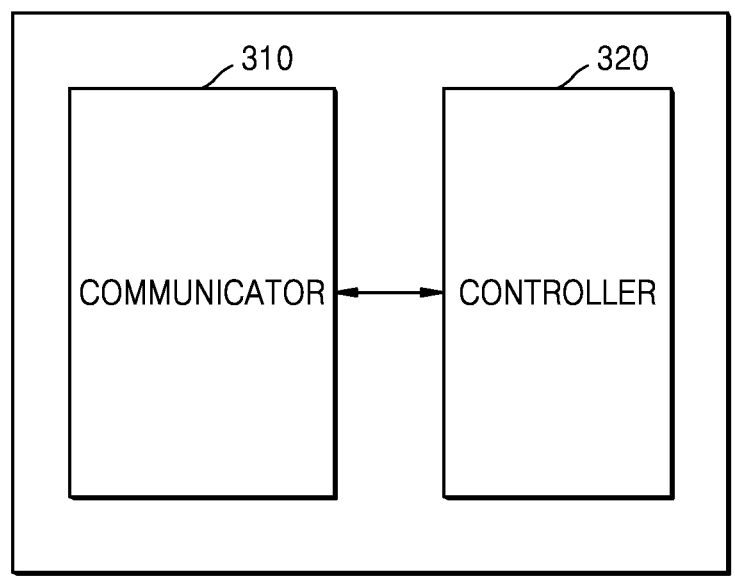
FIGS. 20 and 21 are block diagrams of a second terminal according to various embodiments of the present disclosure.
Figure 21:
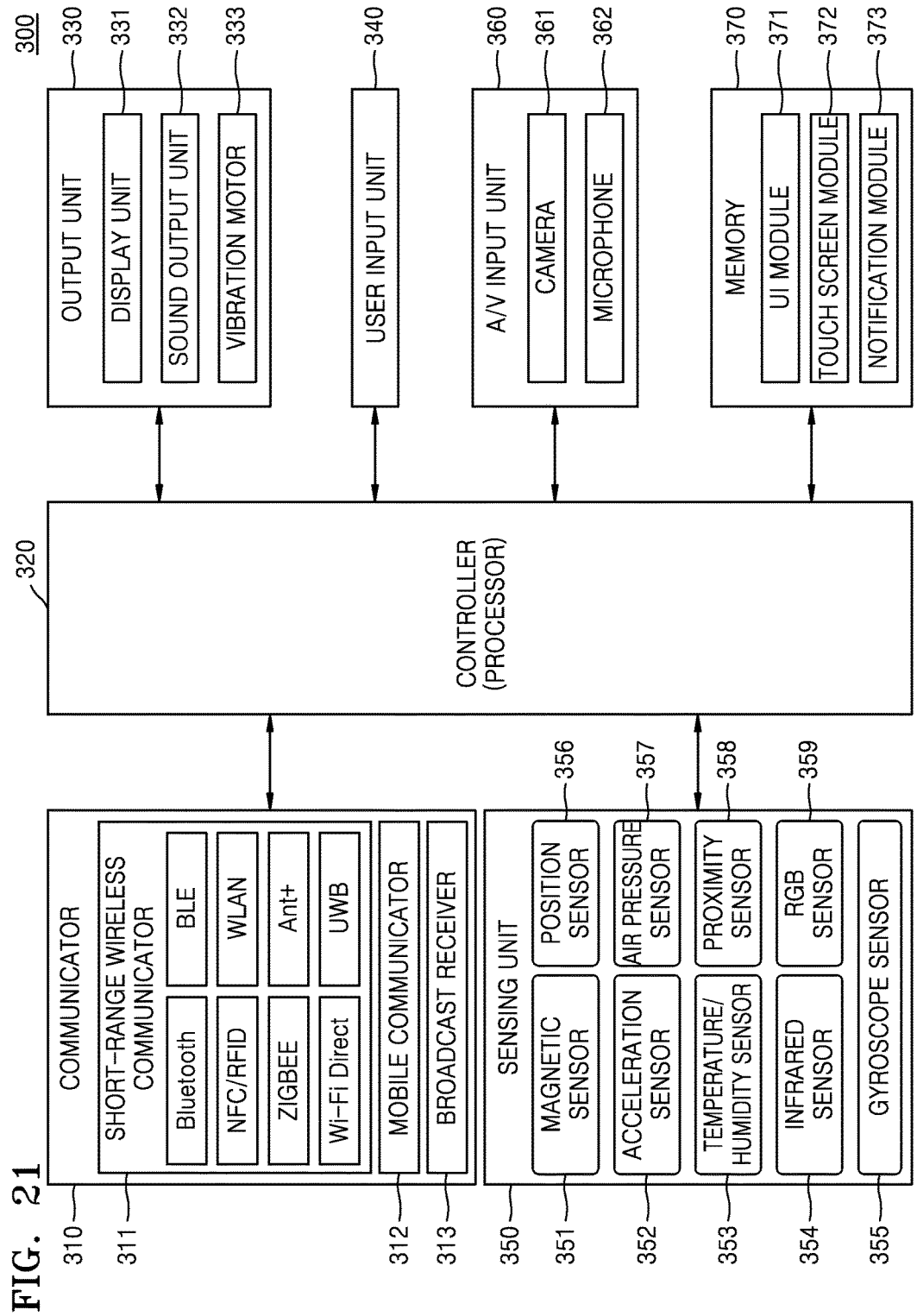

FIGS. 20 and 21 are block diagrams of a second terminal according to various embodiments of the present disclosure.

Referring to FIG. 20, the second terminal 300 may include a communicator 310 and a controller 320 (also referred to as a processor 320). However, not all shown elements are necessary elements. That is, the second terminal 300 may be embodied with more elements than the shown elements or may be embodied with fewer elements than the shown elements.

Referring to FIG. 21, the second terminal 300 according to the present embodiment may further include an output unit 330, a user input unit 340, a sensing unit 350, an A/V input unit 360, and a memory 370, in addition to the communicator 310 and the controller 320.

Hereinafter, the elements are sequentially described below.

The communicator 310 may request the authorization server 200 for authentication information regarding a service. When a user of the second terminal 300 is included in a user of at least one terminal, the communicator 310 may receive the authentication information from the authorization server 200.

The communicator 310 according to the present embodiment may transmit the received authentication information to a service providing apparatus that provides the service. In addition, the communicator 310 may receive validity period information corresponding to the user of the second terminal 300 from the authorization server 200.

The communicator 310 may include one or more elements allowing communication between the second terminal 300 and other devices. Here, the other devices may include the authorization server 200 and the first terminal 100. For example, the communicator 310 may include a short-range wireless communicator 311, a mobile communicator 312, and a broadcast receiver 313.

The short-range wireless communicator 311 may include, but is not limited to, a BT communicator, a BLE communicator, a NFC unit, a WLAN (Wi-Fi) communicator, a ZigBee communicator, an IrDA communicator, a WFD communicator, a UWB communicator, and an Ant+ communicator.

The mobile communicator 312 exchanges a wireless signal with at least one of a base station, an external terminal, and a server on a mobile communication network. The wireless signal may include various types of data according to communication of a sound call signal, a video call signal, or a text/multimedia message.

The broadcast receiver 313 receives a broadcast signal and/or information related to a broadcast from the outside through a broadcast channel. The broadcast channel may include a satellite channel and a ground wave channel. In another embodiment, the second terminal 300 may not include the broadcast receiver 313.

The controller 320 generally controls all operations of the second terminal 300. For example, the controller 320 may control the communicator 310, the output unit 330, the user input unit 340, the sensing unit 350, the A/V input unit 360, and the memory 370 by executing programs stored in the memory 370.

The controller 320 may obtain a use authority with respect to the service during a temporal range set with respect to the second terminal 300, based on the received authentication information. For example, the controller 320 may control the communicator 310 to transmit the received authentication information to a service providing apparatus that provide the service.

The controller 320 may select a service with respect to which use authority is to be shared, based on an input by the user of the second terminal 300. When the controller 320 selects the service, a request for sharing the use authority with respect to the service may be transmitted to the authorization server 200 by using the communicator 310.

The output unit 330 may output a text, an image signal, an audio signal, or a vibration signal, and may include a display unit 331, a sound output unit 332, a vibration motor 333, or the like.

The display unit 331 may display the authentication information received from the authorization server 200. In addition, the display unit 331 may display information about a validity period during which the use authority with respect to the service is shared, the information being received from the authorization server 200.

When the use authority with respect to the service is obtained by using the authentication information, the display unit 331 may display a user interface required to receive the service. The user interface required to receive the service may be received from the service providing apparatus when the authentication information obtained by the second terminal 300 is transmitted to the authorization server 200.

The display unit 331 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

The display unit 331 and a touch pad may form a mutual layer structure and then may be formed as a touch screen. The display unit 331 may include at least one of an LCD, a TFT-LCD, an OLED display, a flexible display, a 3D display, and an electrophoretic display. According to a type of the second terminal 300, the second terminal 300 may include at least two display units 331.

The sound output unit 332 may output audio data that is received from the communicator 310 or is stored in the memory 370. The sound output unit 332 may also output a sound signal (e.g., a call signal receiving sound, a message receiving sound, a notifying sound, or the like) related to capabilities performed by the second terminal 300. The sound output unit 332 may include a speaker, a buzzer, or the like.

The vibration motor 333 may output a vibration signal. For example, the vibration motor 333 may output the vibration signal that corresponds to an output of the audio data (e.g., the call signal receiving sound, the message receiving sound, or the like) or video data. When a touch is input to the touch screen, the vibration motor 333 may output a vibration signal.

The user input unit 340 may indicate a unit by which a user inputs data so as to control the second terminal 300. For example, the user input unit 340 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

According to the present embodiment, a request for sharing a use authority with respect to a selected service may be transmitted to the authorization server 200, based on a user input sensed by the user input unit 340.

The sensing unit 350 may sense a state of the second terminal 300 or a status around the second terminal 300 and may transfer sensed information to the controller 320.

The sensing unit 350 may include, but is not limited to, at least one of a magnetic sensor 351, an acceleration sensor 352, a temperature/humidity sensor 353, an infrared sensor 354, a gyroscope sensor 355, a position sensor 356 (e.g., a GPS sensor), an air pressure sensor 357, a proximity sensor 358, and an RGB sensor (i.e., a luminance sensor) 359. Functions of the sensors may be intuitionally deduced by one of ordinary skill in the art by referring to names of the sensors, and thus, detailed descriptions thereof are omitted here.

The A/V input unit 360 may receive an input of an audio signal or a video signal and may include a camera 361 and a microphone 362. The camera 361 may obtain an image frame such as a still image or a moving picture via an image sensor during a video call mode or an image-capturing mode. An image that is captured via the image sensor may be processed by the controller 320 or a separate image processing unit (not shown).

The image frame that is processed by the camera 361 may be stored in the memory 370 or may be transmitted to an external source via the communicator 310. According to a configuration of the second terminal 300, two or more cameras 361 may be arranged.

The microphone 362 receives an input of an external sound signal and processes the received sound signal into electrical voice data. For example, the microphone 362 may receive a sound signal from an external device or a speaker. In order to remove noise that occurs while the sound signal is externally input, the microphone 362 may use various noise removing algorithms.

The memory 370 may store a program for processing and controlling the controller 320, and may store a plurality of pieces of data that are input to or output from the second terminal 300.

The memory 370 may include a storage medium of at least one type selected from a flash memory, a hard disk, a multimedia card type memory, a card type memory such as a SD or xD card memory, a RAM, a SRAM, a ROM, an EEPROM, a PROM, a magnetic memory, a magnetic disc, and an optical disc. The second terminal 300 may run web storage or a cloud server that performs a storage function of the memory 370 on the Internet.

The programs stored in the memory 370 may be classified into a plurality of modules according to their functions, for example, into a UI module 371, a touch screen module 372, a notification module 373, etc.

The UI module 371 may provide a specialized UI or GUI associated with the second terminal 300 for each service.

The UI module 371 may divide a screen so as to allow a plurality of windows to be displayed thereon. The UI module 371 may display a plurality of items of data related to a plurality of services on the plurality of windows, respectively, wherein the services are executed in the second terminal 300.

The touch screen module 372 may detect a user's touch gesture on the touch screen and transmit information related to the touch gesture to the controller 320.

The touch screen module 372 according to the present embodiment may recognize and analyze a touch code. The touch screen module 372 may be configured by additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The notification module 373 may generate a signal for notifying the user about an occurrence of an event in the second terminal 300. Examples of the event that may occur in the second terminal 300 include a call signal receiving event, a message receiving event, a key signal input event, a schedule notifying event, or the like.

The notification module 373 may output an alarm signal in the form of a video signal via the display unit 331, an alarm signal in the form of an audio signal via the sound output unit 332, or an alarm signal in the form of a vibration signal via the vibration motor 333.

The methods according to the embodiments can be embodied as programmed commands to be executed in various computer means, and then can be recorded to a non-transitory computer-readable recording medium. The non-transitory computer readable recording medium may include one or more of the programmed commands, data files, data structures, or the like. The programmed commands recorded to the non-transitory computer-readable recording medium may be particularly designed or configured for the disclosure or may be well known to one of ordinary skill in the art. Examples of the non-transitory computer-readable recording medium include magnetic media including hard disks, magnetic tapes, and floppy disks, optical media including compact disc ROMs (CD-ROMs), and digital versatile discs (DVDs), magneto-optical media including floptical disks, and a hardware apparatus designed to store and execute the programmed commands in ROM, RAM, flash memories, and the like. Examples of the programmed commands include not only machine codes generated by a compiler but also include great codes to be executed in a computer by using an interpreter.

The apparatuses according to the embodiments may include a processor, a memory for storing and executing program data, a permanent storage including a disk drive, a communication port for communication with an external device, a user interface device including a touch panel, a key, a button, and the like. The methods embodied as a software module or an algorithm may be stored as computer-readable codes or program commands that are executable on the processor in a non-transitory computer-readable recording medium. The non-transitory computer-readable recording medium is any data storage device that can store data which can be thereafter read by a computer system. Examples of the non-transitory computer-readable recording medium include magnetic storage mediums (e.g., ROMs, RAMs, floppy disks, hard disks, etc.) and optical reading mediums including CD-ROMs, DVDs, etc. The non-transitory computer-readable recording medium can also be distributed over network-coupled computer systems so that the computer-readable code is stored and executed in a distributed fashion. The mediums can be read by computers, can be stored in the memory, and can be executed on the processor.

Reference numerals have been made to the embodiments illustrated in the drawings, and specific language has been used to describe the embodiments. However, no limitation of the scope of the disclosure is intended by this specific language, and the disclosure should be construed to encompass all embodiments that would normally occur to one of ordinary skill in the art.

The embodiments may be described in terms of functional block components and various processing operations. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. The embodiments may employ same or different types of cores and different types of CPUs. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Furthermore, the embodiments could employ any number of techniques according to the related art for electronics configuration, signal processing and/or control, data processing and the like. The words "mechanism", "element", "means", or "configuration" may be used broadly and is not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, electronics according to the related art, control systems, software development and other functional aspects of the systems (and components of the individual operating components of the systems) may not be described in detail. Furthermore, the connecting lines, or connectors shown in the various figures presented are intended to represent various functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential", "critical", and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a second terminal for sharing a use authority of a service allowed by a first user of a first terminal, the method comprising:
    displaying a first user interface comprising a list of services for which sharing of use authorities is allowed for a second user of the second terminal by at least one other user;
    based on obtaining an input selecting a service from among the services in the list, displaying a second user interface associated with the shared use authority of the service, the second user interface comprising a detailed information icon for displaying detailed information of the shared use authority and a use icon for requesting execution of the service;
    based on obtaining an input for selecting the detailed information icon in the second user interface, displaying a third user interface comprising information of the first user who shared the use authority with the second user of the second terminal and information of a validity period during which the use authority of the service is shared with the second user of the second terminal; and
    based on obtaining an input for selecting the use icon in the second user interface:
        transmitting, by a transceiver controlled by at least one processor, to an authorization server a request for authentication information of the service, wherein the authorization server stores identification information of the second user, with whom the use authority of the service is sharable, and the validity period during which the use authority of the service is shared with the second user;
        when the second user of the second terminal corresponds to the second user, receiving, by the transceiver, the authentication information from the authorization server; and
        obtaining the use authority of the service during the validity period based on the received authentication information.

2. The method of claim 1, further comprising:
    transmitting, by the transceiver, the authentication information to the first terminal that provides the service.

3. The method of claim 1, further comprising:
    receiving, by the transceiver, from the authorization server, the validity period.

4. A second terminal for sharing a use authority of a service allowed by a first user of a first terminal, the second terminal comprising:
    a display;
    a transceiver; and
    at least one processor configured to:
        control the display to display a first user interface comprising a list of services for which sharing of use authorities is allowed for a second user of the second terminal by at least one other user,
        based on obtaining an input selecting the service from among the services in the list, control the display to display a second user interface associated with the shared use authority of the service, the second user interface comprising a detailed information icon for displaying detailed information of the shared use authority and a use icon for requesting execution of the service,
        based on obtaining an input for selecting the detailed information icon in the second user interface, control the display to display a third user interface comprising information of the first user who shared the use authority with the second user of the second terminal and information of a validity period during which the use authority of the service is shared with the second user of the second terminal, and
        based on obtaining an input for selecting the use icon in the second user interface:
            control the transceiver to transmit to an authorization server a request for authentication information of the service, wherein the authorization server stores identification information of the second user, with whom the use authority of the service is sharable, and the validity period during which the use authority of the service is shared with the second user,
            control the transceiver to receive the authentication information from the authorization server, when the second user of the second terminal corresponds to the second user, and
            obtain the use authority during the validity period based on the received authentication information.

5. The second terminal of claim 4, wherein the at least one processor is further configured to control the transceiver to transmit the authentication information to the first terminal that provides the service.

6. The second terminal of claim 4, wherein the at least one processor is further configured to control the transceiver to receive, from the authorization server, the validity period.

7. A computer program product comprising a computer readable storage medium having a computer readable program stored therein, wherein the computer readable program, when executed on a computing device, causes the computing device to:
    control a display to display a first user interface comprising a list of services for which sharing of use authorities is allowed for a second user of a second terminal by at least one other user,
    based on obtaining an input selecting a service from among the services in the list, control the display to display a second user interface associated with a shared use authority of the service, the second user interface comprising a detailed information icon for displaying detailed information of the shared use authority and a use icon for requesting execution of the service,
    based on obtaining an input for selecting the detailed information icon in the second user interface, control the display to display a third user interface comprising information of the first user who shared the use authority with the second user of the second terminal and information of a validity period during which the use authority of the service is shared with the second user of the second terminal, and
    based on obtaining an input for selecting the use icon in the second user interface:
    obtain an input selecting a service from among the services in the list,
    transmit, by a transceiver, to an authorization server a request for authentication information of the service, wherein the authorization server stores identification information of second user, with whom the use authority of the service is sharable, and the validity period during which the use authority of the service is shared with the second user, control a transceiver to receive the authentication information from the authorization server, when the second user of the second terminal corresponds to the second user, and obtain the use authority during the validity period based on the received authentication information.

8. The computer program product of claim 7, wherein the computer readable program, when executed on the computing device, further causes the computing device to control the transceiver to transmit the authentication information to a first terminal that provides the service.

9. The computer program product of claim 7, wherein the computer readable program, when executed on the computing device, further causes the computing device to control the transceiver to receive, from the authorization server, the validity period.

* * * * *